United States Patent
Chang et al.

(10) Patent No.: US 8,478,836 B1
(45) Date of Patent: Jul. 2, 2013

(54) PROXY CACHE TECHNOLOGY

(75) Inventors: Jack H. Chang, Saratoga, CA (US);
William H. Sheu, Fremont, CA (US);
Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 209 days.

(21) Appl. No.: 12/794,981

(22) Filed: Jun. 7, 2010

(51) Int. Cl.
*G06F 15/167* (2006.01)

(52) U.S. Cl.
USPC ........... 709/213; 709/203; 709/217; 709/218; 709/219; 709/224; 711/118; 711/122; 711/130; 711/133; 725/109

(58) Field of Classification Search
USPC .......... 709/213, 203, 217–219, 224; 711/118, 711/122, 130, 133; 725/109
See application file for complete search history.

(56) References Cited

U.S. PATENT DOCUMENTS

| | | | |
|---|---|---|---|
| 5,732,267 A * | 3/1998 | Smith ............................... 713/1 |
| 6,167,438 A * | 12/2000 | Yates et al. .................... 709/216 |
| 7,089,579 B1 | 8/2006 | Mao et al. |
| 7,165,050 B2 * | 1/2007 | Marking ......................... 705/51 |
| 7,225,456 B2 | 5/2007 | Kitsukawa et al. |
| 7,734,875 B1 * | 6/2010 | Hervas .......................... 711/133 |
| 2002/0184634 A1 | 12/2002 | Cooper |
| 2003/0005084 A1 * | 1/2003 | Humphrey .................... 709/218 |
| 2003/0110503 A1 | 6/2003 | Perkes |
| 2003/0221197 A1 | 11/2003 | Fries et al. |
| 2005/0081244 A1 | 4/2005 | Barrett et al. |
| 2006/0075428 A1 | 4/2006 | Farmer et al. |
| 2007/0277219 A1 | 11/2007 | Toebes et al. |
| 2008/0022320 A1 | 1/2008 | Ver Steeg |
| 2008/0115182 A1 | 5/2008 | Van Willigenburg |
| 2009/0106358 A1 * | 4/2009 | Mitsuoka et al. ............. 709/203 |

FOREIGN PATENT DOCUMENTS

WO    WO2006041784 A2    4/2006

* cited by examiner

*Primary Examiner* — Andrew Georgandellis
(74) *Attorney, Agent, or Firm* — Fish & Richardson P.C.

(57) ABSTRACT

Proxy cache technology, in which a system determines a subset of content files to include in a proxy cache maintained by a network service provider that provides network service to user downloader devices included in a content delivery network. The system controls the network service provider to store the subset of content files in the proxy cache. The system also controls the user downloader devices to attempt to use the proxy cache as a peer to download a content file prior to using an external peer.

18 Claims, 15 Drawing Sheets

US 8,478,836 B1

PROXY CACHE TECHNOLOGY

FIELD

The present disclosure generally relates to proxy cache technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of controlling a downloader device to download content from a cache includes determining a subset of content files to include in a proxy cache maintained by a network service provider that provides network service to a user downloader device included in a content delivery network. The method also includes controlling the network service provider to store the subset of content files in the proxy cache. The method further includes controlling the user downloader device to attempt to use the proxy cache as a peer to download a content file prior to using an external peer accessible, to the user downloader device, on an external network through the network service provider.

Implementations may include one or more of the following features. For example, the method may include monitoring download requests of multiple, different user downloader devices serviced by the network service provider and, based on the monitoring of the download requests of multiple, different user downloader devices, determining, for each of multiple content files that have been downloaded, an actual download score that is indicative of bandwidth being used in servicing download requests for the corresponding content file. In this example, the method may include selecting a subset of one or more content files to include in the proxy cache based on the determined actual download scores.

In some implementations, the method may include determining, for each of the multiple content files that have been downloaded, a download frequency of requests for the corresponding content file received from downloader devices and identifying, for each of the multiple content files that have been downloaded, a size of the corresponding content file. In these implementations, the method may include determining, for each of the multiple content files that have been downloaded, an actual download score that is indicative of bandwidth being used in servicing download requests for the corresponding content file based on the determined download frequency and the identified size of the corresponding content file.

In some examples, the method may include identifying, for each of the multiple downloaded content files and from among download requests received from downloader devices serviced by multiple, different network service providers, download requests for the corresponding content file received from downloader devices serviced by a particular network service provider and determining, for each of the multiple downloaded content files, a download frequency of the identified download requests for the corresponding content file received from downloader devices serviced by the particular network service provider. In these examples, the method may include determining, for each of the multiple downloaded content files, an actual download score that is indicative of bandwidth being used by the particular network service provider in servicing download requests for the corresponding content file based on the determined download frequency of the identified download requests and the identified size of the corresponding content file.

In addition, the method may include determining, for each of the identified download requests, a type of peer handling the corresponding download request. The type of peer may include at least one of an internal peer that is within a network of the particular network service provider and an external peer that is outside of the network of the particular network service provider. The method also may include determining, for each of the multiple downloaded content files, an external download frequency of the identified download requests for the corresponding content file received from downloader devices serviced by the particular network service provider based on the identified download requests and the determination of the type of peer handling each of the identified download requests. The determination of the external download frequency may place a higher value on download requests for which the type of peer handling the corresponding download request was determined to be an external peer than download requests for which the type of peer handling the corresponding download request was determined to be an internal peer.

In some implementations, the method may include monitoring additions of content files to channels offered by the content delivery network and, based on the monitoring of the additions of content files to channels offered by the content delivery network, determining, for each of multiple content files added to a channel, an anticipated download score indicative of bandwidth anticipated to be used in servicing download requests for the corresponding content file. In these implementations, the method may include selecting a subset of one or more content files to include in the proxy cache based on the determined anticipated download scores.

In some examples, the method may include identifying, for each of the multiple content files added to a channel, subscribers that are serviced by a particular network service provider and that subscribe to a channel to which the corresponding content file has been added and identifying, for each of the multiple content files added to a channel, a size of the corresponding content file. In these examples, the method may include determining, for each of the multiple content files added to a channel, an anticipated download score that is indicative of bandwidth anticipated to be used by the particular network service provider in servicing download requests for the corresponding content file based on the identified subscribers that subscribe to the channel to which the corresponding content file has been added and the identified size of the corresponding content file.

Further, the method may include determining, for each of the multiple content files that have been added to a channel, a metric indicative of anticipated download availability of the corresponding content file from a peer that is within a network of the particular network service provider and determining, for each of the multiple content files added to a channel, an anticipated download score that is indicative of bandwidth anticipated to be used by the particular network service provider in servicing download requests for the corresponding content file based on the identified subscribers that subscribe to the channel to which the corresponding content file has been added, the identified size of the corresponding content file, and the determined metric indicative of anticipated download availability of the corresponding content file from a peer that is within a network of the particular network service provider.

In some implementations, the method may include monitoring download requests of multiple, different user downloader devices serviced by the network service provider and, based on the monitoring of the download requests of the multiple, different user downloader devices serviced by the network service provider, determining, for each of multiple downloaded content files, an actual download score that is indicative of bandwidth being used in servicing download requests for the corresponding content file. In these implementations, the method may include monitoring additions of content files to channels offered by the content delivery network and, based on the monitoring of the additions of content files to channels offered by the content delivery network, determining, for each of multiple content files that have been added to a channel, an anticipated download score that is indicative of bandwidth anticipated to be used in servicing download requests for the corresponding content file. In these implementations, the method may include determining, for each of multiple content files, a cache benefit score based on the actual download score for the corresponding content file and the anticipated download score for the corresponding content file and selecting a subset of one or more content files to include in the proxy cache maintained by the network service provider based on the determined cache benefit scores.

In some examples, the method may include accessing, from electronic storage, a threshold cache benefit score and comparing each of the determined cache benefit scores to the accessed threshold cache benefit score. In these examples, the method may include determining whether each of the determined cache benefit scores indicates a cache benefit that exceeds a cache benefit indicated by the accessed threshold cache benefit score and, based on determination results, selecting one or more content files having a cache benefit score that indicates a cache benefit that exceeds a cache benefit indicated by the accessed threshold cache benefit score. The method may include identifying, from among the multiple content files for which a cache benefit score was determined, a threshold number of content files having cache benefit scores that indicate a highest cache benefit and selecting the threshold number of content files having cache benefit scores that indicate a highest cache benefit.

Further, the method may include monitoring actual and anticipated download information across multiple, different network service providers and grouping the monitored actual and anticipated download information by network service provider. The method may include determining, for each of the multiple, different network service providers, cache benefit scores for content files based on the grouped actual and anticipated download information for the corresponding network service provider and selecting, for each of the multiple, different network service providers, content files to include in the proxy cache based on the determined cache benefit scores. The selected content files may be different among the multiple, different network service providers with content files selected for a first network service provider being different than content files selected for a second network service provider.

In some implementations, the method may include identifying one or more new content files to include in the proxy cache, determining a storage size of the one or more new content files to include in the proxy cache, and determining an amount of storage space available in the proxy cache. In these implementations, the method may include comparing the determined storage size of the one or more new content files to the determined amount of storage space available in the proxy cache and determining whether storage space is available in the proxy cache to accommodate the one or more new content files. In response to a determination that storage space is available in the proxy cache to accommodate the one or more new content files, the one or more new content files may be stored in the proxy cache without removing content files previously stored in the proxy cache. In response to a determination that storage space is not available in the proxy cache to accommodate the one or more new content files, one or more content files previously stored in proxy cache may be selected to remove and the one or more selected content files previously stored in proxy cache may be replaced in the proxy cache with the one or more new content files.

In addition, the method may include determining a cache benefit of maintaining one or more previously stored content files in the proxy cache and selecting one or more content files previously stored in the proxy cache to remove based on the determined cache benefit of maintaining one or more previously stored content files in the proxy cache. Further, the method may include determining a size of one or more previously stored content files relative to the size of the one or more new content files and selecting one or more content files previously stored in proxy cache to remove based on the determined cache benefit of maintaining one or more previously stored content files in the proxy cache and the determined size of one or more previously stored content files relative to the size of the one or more new content files.

In some examples, identifying peers in a same block of a network of the network service provider as a user downloader device, attempting to download the content file from the identified peers in the same block of the network of the network service provider, and determining whether the attempt to download the content file from the identified peers in the same block of the network of the network service provider was successful. In response to a determination that the attempt to download the content file from the identified peers in the same block of the network was unsuccessful, attempting to download the content file using the proxy cache as a peer.

The method may include determining whether the attempt to download the content file using the proxy cache as a peer was successful and, in response to a determination that the attempt to download the content file using the proxy cache as a peer was unsuccessful, downloading the content file from an external peer that is outside of the network of the network service provider. The method also may include, in response to downloading the content file from the external peer that is outside of the network of the network service provider, determining whether to cache the content file downloaded from the external peer in the proxy cache.

In another aspect, a system includes at least one computer and at least one computer-readable medium coupled to the at least one computer having instructions stored thereon which, when executed by the at least one computer, causes the at least one computer to perform operations. The operations include determining a subset of content files to include in a proxy cache maintained by a network service provider that provides network service to user downloader devices included in a content delivery network. The operations also include controlling the network service provider to store the subset of content files in the proxy cache. The operations further include controlling the user downloader devices to attempt to use the proxy cache as a peer to download a content file prior to using an external peer accessible, to the user downloader devices, on an external network through the network service provider.

In yet another aspect, at least one computer-readable storage medium is encoded with at least one computer program comprising instructions that, when executed, operate to cause a computer to perform operations. The operations include determining a subset of content files to include in a proxy cache maintained by a network service provider that provides network service to user downloader devices included in a content delivery network. The operations also include controlling the network service provider to store the subset of content files in the proxy cache. The operations further include controlling the user downloader devices to attempt to use the proxy cache as a peer to download a content file prior to using an external peer accessible, to the user downloader devices, on an external network through the network service provider.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

Figure 1:
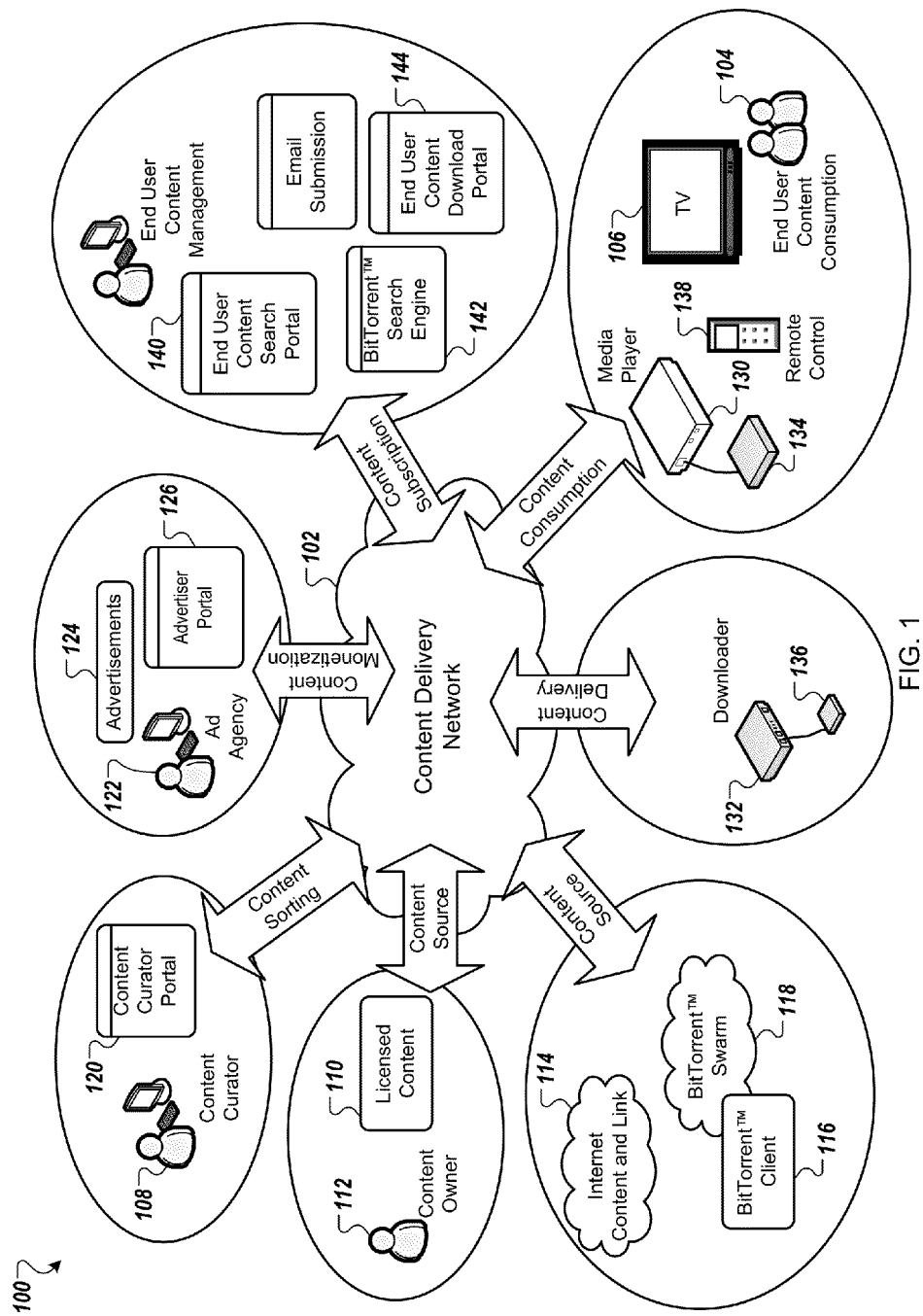
FIGS. 1, 2, 3, 9, 12, and 15 are diagrams of exemplary systems.

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTNT™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134, 136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142. As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
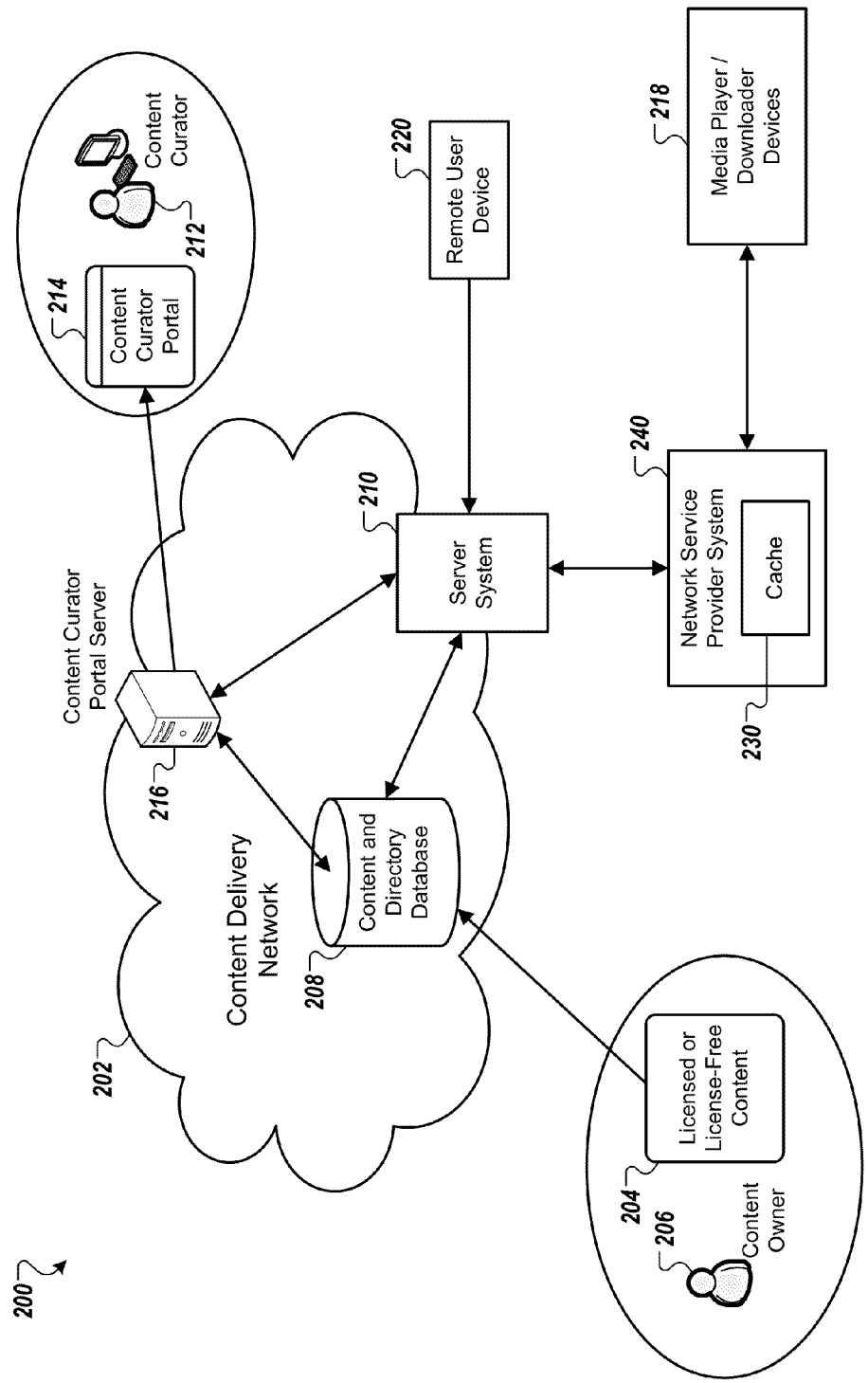

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content included in the private collection of the content curator 212 or content available on the Internet, such as content available from peer-to-peer networks, such as BitTorrent™.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implementations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTNT™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded to one or more user media player/downloader devices 218. For example, content corresponding to a user-subscribed channel may be automatically downloaded to the media player/downloader device 218, in response to a user selection of a corresponding channel. Content may be downloaded to a media player/downloader device 218, for example, from a proxy cache 230 included in a network service provider system 240 or from another media player/downloader device 218 included in the same network block of the network service provider system 240. As another example, a user may search for and download content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

Figure 3:
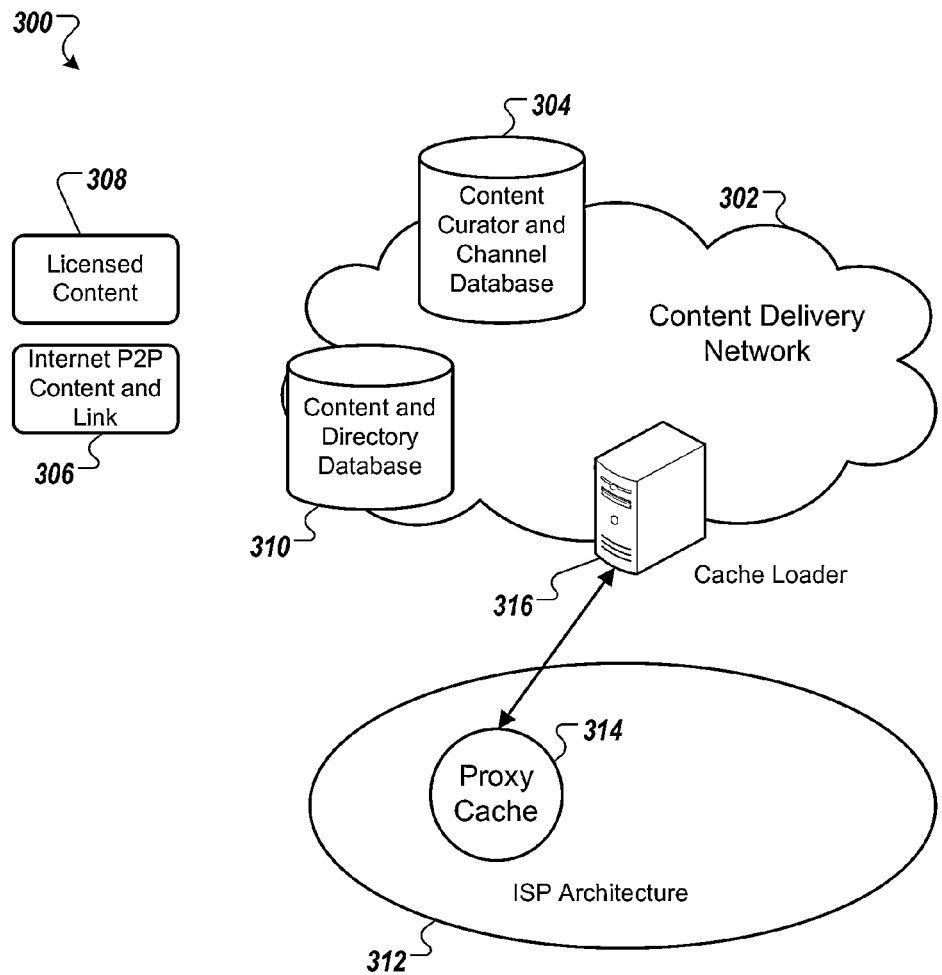

FIG. 3 illustrates an exemplary system 300 for caching content. The system 300 includes a content delivery network 302 through which content is delivered to subscribers. Subscribers may subscribe to one or more channels, such as a channel defined by a content curator. Channel information, such as channel definitions and supplementary channel information, may be stored in a content curator and channel database 304.

A content curator may define content to include in a channel. Channel content may include, among other content, Internet content 306 and licensed content 308. Channel content may be stored in a content and directory database 310. Content may be delivered to end users using the content delivery network 302 and a network service provider (e.g., Internet Service Provider (ISP)) architecture 312.

To reduce bandwidth strain on the network service provider architecture 312, content may be cached to a proxy cache 314 included in the network service provider architecture 312. A cache loader 316 may determine a subset of content files to cache in the proxy cache 314. In response to a content download request from a user media player/downloader device, an attempt may be made to download content from a peer media player/downloader device located in the same network block of the network service provider architecture 312 as the user media player/downloader device (e.g., requests may be downloaded from an "internal peer"). If the attempt to download the requested content from the internal peer is unsuccessful, an attempt may be made to download the requested content from the proxy cache 314. Or, as another example, an attempt may be made to download the requested content from the database 310 (e.g., using HTTP (Hyper Text Transfer Protocol)). If the attempt to download the requested content from the proxy cache 314 is unsuccessful, the requested content may be downloaded from an external peer.

Figure 4:
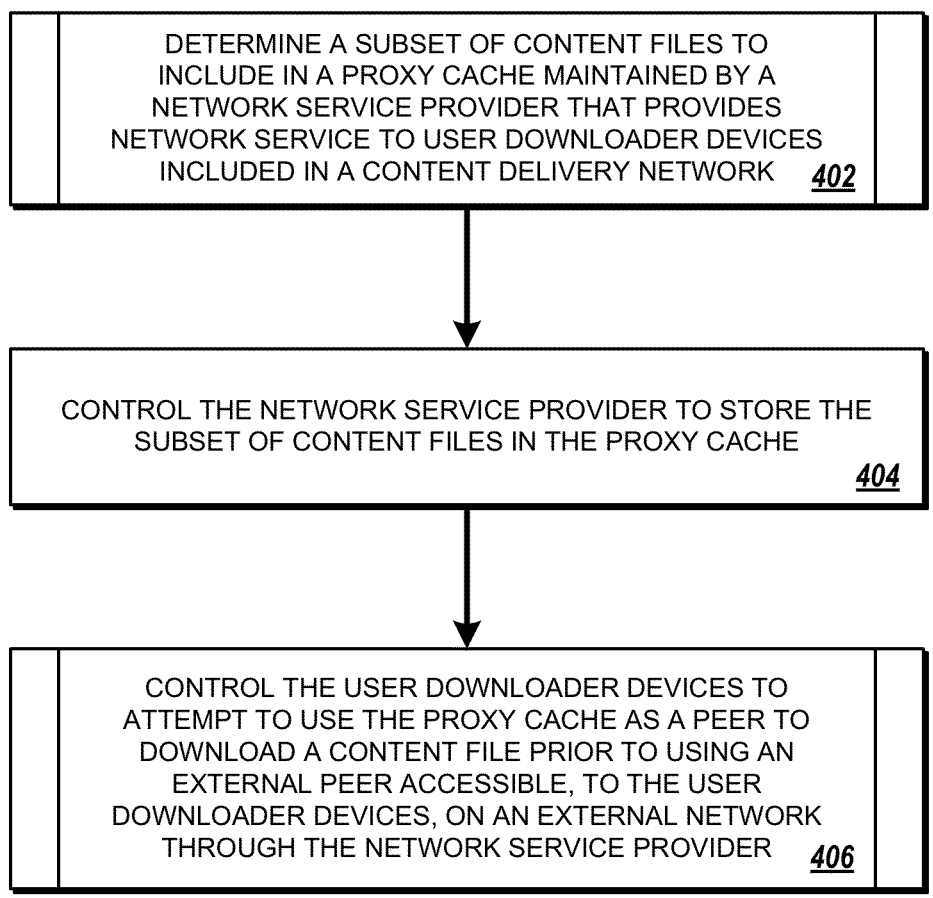
FIGS. 4-8, 11, and 13 are flowcharts of exemplary processes.

FIG. 4 illustrates a process 400 for caching content. The operations of the process 400 are described generally as being performed by the system 200. The operations of the process 400 may be performed by one of the components of the system 200 (e.g., the server system 210) or may be performed by a combination of the components of the system 200. In some implementations, operations of the process 400 may be performed by one or more processors included in one or more electronic devices.

The system 200 determines a subset of content files to include in a proxy cache maintained by a network service provider that provides network service to user media player/downloader devices included in a content delivery network (402). For instance, in the example of FIG. 3, the cache loader 316 may determine a subset of content files stored in the content and directory database 310 to include in the proxy cache 314. Determining a subset of content files is described in more detail below with respect to FIGS. 5 and 8.

Figure 5:
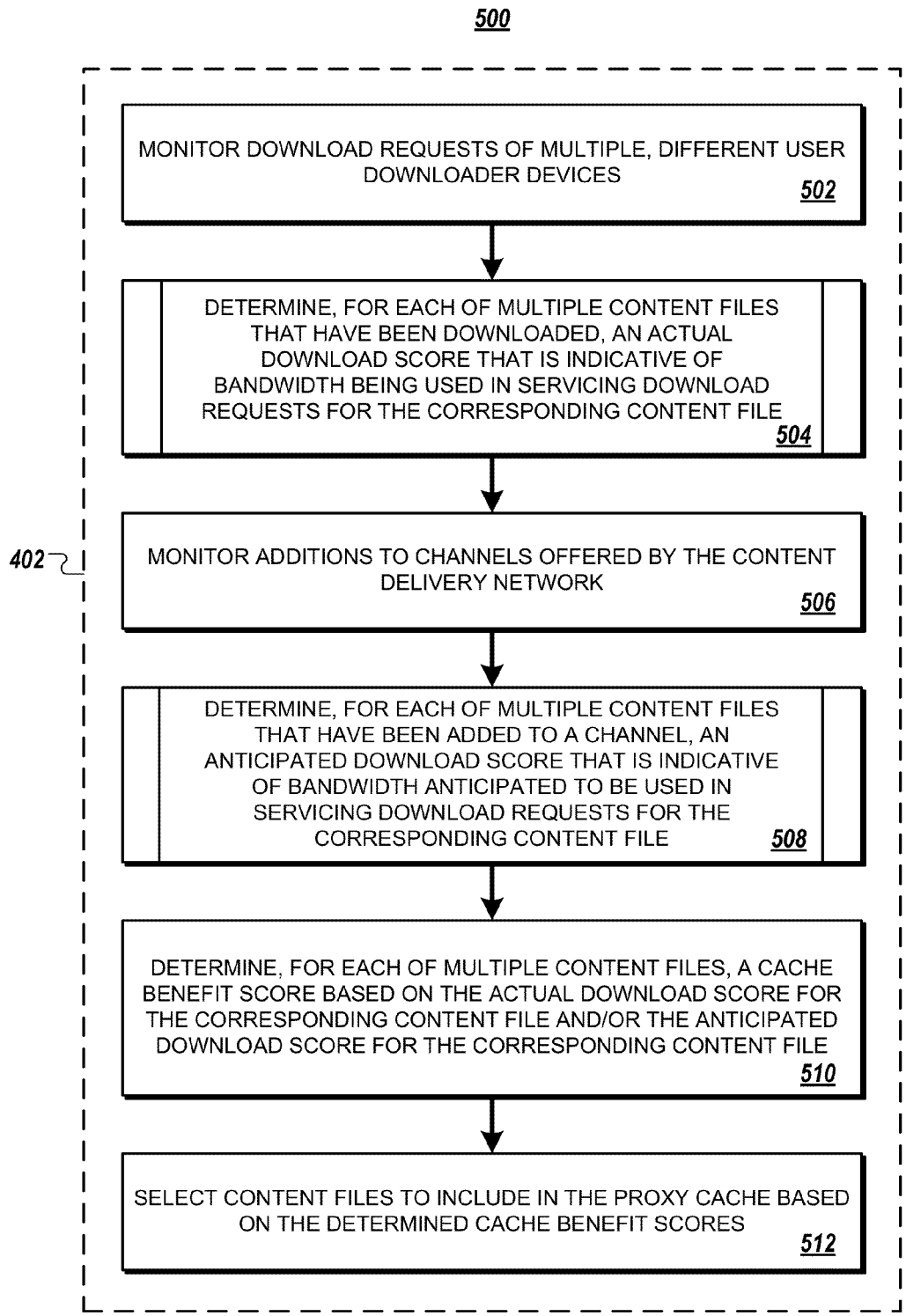

FIG. 5 illustrates a process 500 for determining a subset of content files to include in a proxy cache. The process 500 may be used in determining a subset of content files to include in a proxy cache referenced above with respect to reference numeral 402. The operations of the process 500 are described generally as being performed by the system 200. The operations of the process 500 may be performed by one of the components of the system 200 (e.g., the server system 210) or may be performed by a combination of the components of the system 200. In some implementations, operations of the process 500 may be performed by one or more processors included in one or more electronic devices.

The system 200 monitors download requests of multiple, different user media player/downloader devices serviced by a network service provider (502). For example, a request to download content may correspond to delivery of content to a media player/downloader device of a subscriber when the subscriber watches a channel which includes the content file. The download request may be in response to the subscriber switching to the channel which includes the content file, or, in some implementations, content may be pre-downloaded to a subscriber's media player/downloader device (e.g., before the subscriber watches the channel). As another example, a download request may be in response to an end user requesting a download of a content file to their media player/downloader device. For example, an end user may select a content file to download from a download website, or may request a download by submitting an electronic communication to a server system of the content delivery network, where the electronic communication includes a link to the content, a link related to the content (e.g., a link to a BitTorrent™ torrent file), a file related to the content file as an attachment to the electronic communication (e.g., a torrent file attachment), or the content file as an attachment to the electronic communication.

The system 200 determines, for each of multiple content files that have been downloaded, an actual download score that is indicative of bandwidth being used in servicing download requests for the corresponding content file (504). The actual download score may be based on the monitoring of the download requests of multiple, different user media player/downloader devices and may be based, for example, on a determined download frequency of requests for and a size of the corresponding content file. Determining an actual download score is described in more detail below with respect to FIG. 6.

Figure 6:
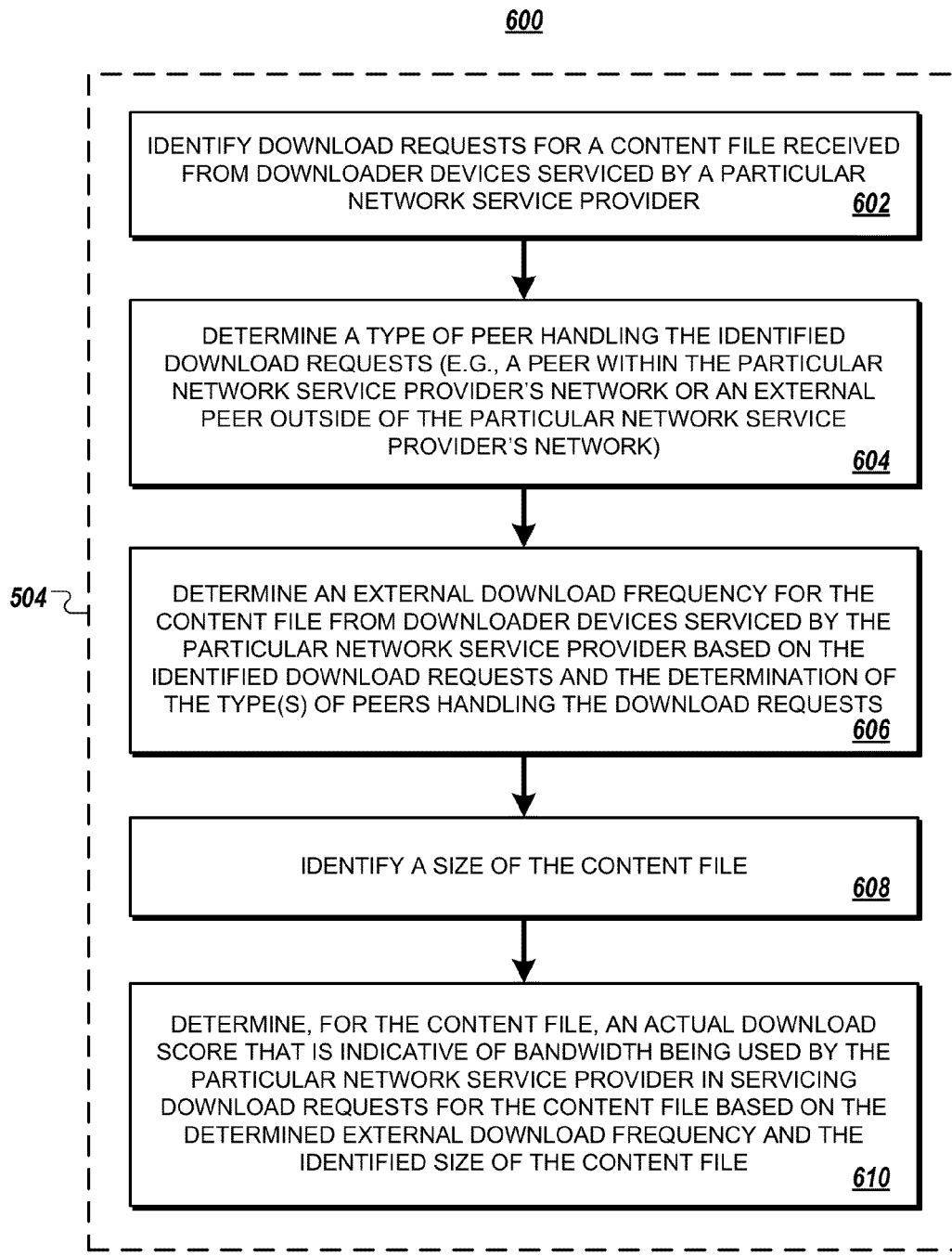

FIG. 6 illustrates a process 600 for determining actual download scores. The process 600 may be used in determining actual download scores referenced above with respect to reference numeral 504. The operations of the process 600 are described generally as being performed by the system 200. The operations of the process 600 may be performed by one of the components of the system 200 (e.g., the server system 210) or may be performed by a combination of the components of the system 200. In some implementations, operations of the process 600 may be performed by one or more processors included in one or more electronic devices.

The system 200 identifies download requests for a content file received from media player/downloader devices serviced by a particular network service provider (602). For example, a request to download content may correspond to delivery of content to a media player/downloader device of a subscriber who is subscribed to a channel which includes the content file. As another example, a download request may be in response to an end user requesting a download of a content file to their media player/downloader device, such as by selecting a content file to download from a download website, or by submitting an electronic communication to a server system of the content delivery network, where the electronic communication includes a link to the content, a link related to the content (e.g., a link to a BitTorrent™ torrent file), a file related to the content file as an attachment to the electronic communication (e.g., a torrent file attachment), or the content as an attachment to the electronic communication.

The system 200 determines a type of peer handling the identified download requests (604). For example, a request may be handled by an internal peer that is within the particular network service provider's network or by an external peer that is outside of the particular network service provider's network. In this example, the system 200 determines whether the request is handled by an internal peer or an external peer.

The system 200 determines an external download frequency for the content file from media player/downloader devices serviced by the particular network service provider based on the identified download requests and the determination of the type(s) of peers handling the download requests (606). In determining the external download frequency, the system 200 may place a higher value on download requests for which the type of peer handling the corresponding download request was determined to be an external peer than download requests for which the type of peer handling the corresponding download request was determined to be an internal peer.

The external download frequency may be determined, for example, by calculating a ratio of requests for the content file handled by external peers to the total number of requests for the content file. For example, if there are a total of ten thousand requests for a particular content file, and if six thousand of those requests are handled by external peers, then the external download frequency may be calculated as six thousand divided by ten thousand, or a value of sixty percent. As another example, the external download frequency may be calculated as a frequency of requests for a particular content file handled by external peers during a given time period. For example, there may be five thousand requests for a particular content file in a given one month period. The external download frequency may be calculated as an average frequency. For example, based on monitoring of download requests over time, the average number of requests per month for a particular content file may be, for example, five thousand.

The system 200 identifies a size of the content file (608). The size of a content file may be the size that the content file occupies in storage. The size may be determined, for example, by querying metadata associated with the file. The size may also be determined by querying a database system for the size of database content associated with the content file or by querying a file system for a file attribute which indicates the size of the content file. As another example, the size of the content file may be computed by processing the file.

The system 200 determines, for the content file, an actual download score that is indicative of bandwidth being used by the particular network service provider in servicing download requests for the content file based on the determined external download frequency and the identified size of the content file (610). For example, an actual download score for a content file with a small size and a low external download frequency may be smaller than an actual download score for a content file with a relatively larger size and/or a relatively higher external download frequency. In some implementations, when determining an actual download score, a weight associated with the external download frequency is the same as a weight associated with the identified size. In some implementations, a weight associated with the external download frequency may be higher than a weight associated with the identified size, and in other implementations, a weight associated with the identified size may be higher than a weight associated with the external download frequency.

Returning to FIG. 5, the system 200 monitors additions to channels offered by the content delivery network (506). For example, the system 200 may monitor modifications to channel information made by a content curator and may identify when a content curator adds a new content file to a channel.

The system 200 determines, for each of multiple content files that have been added to a channel, an anticipated download score that is indicative of bandwidth anticipated to be used in servicing download requests for the corresponding content file (508). Determining an anticipated download score is described in more detail below with respect to FIG. 7.

Figure 7:
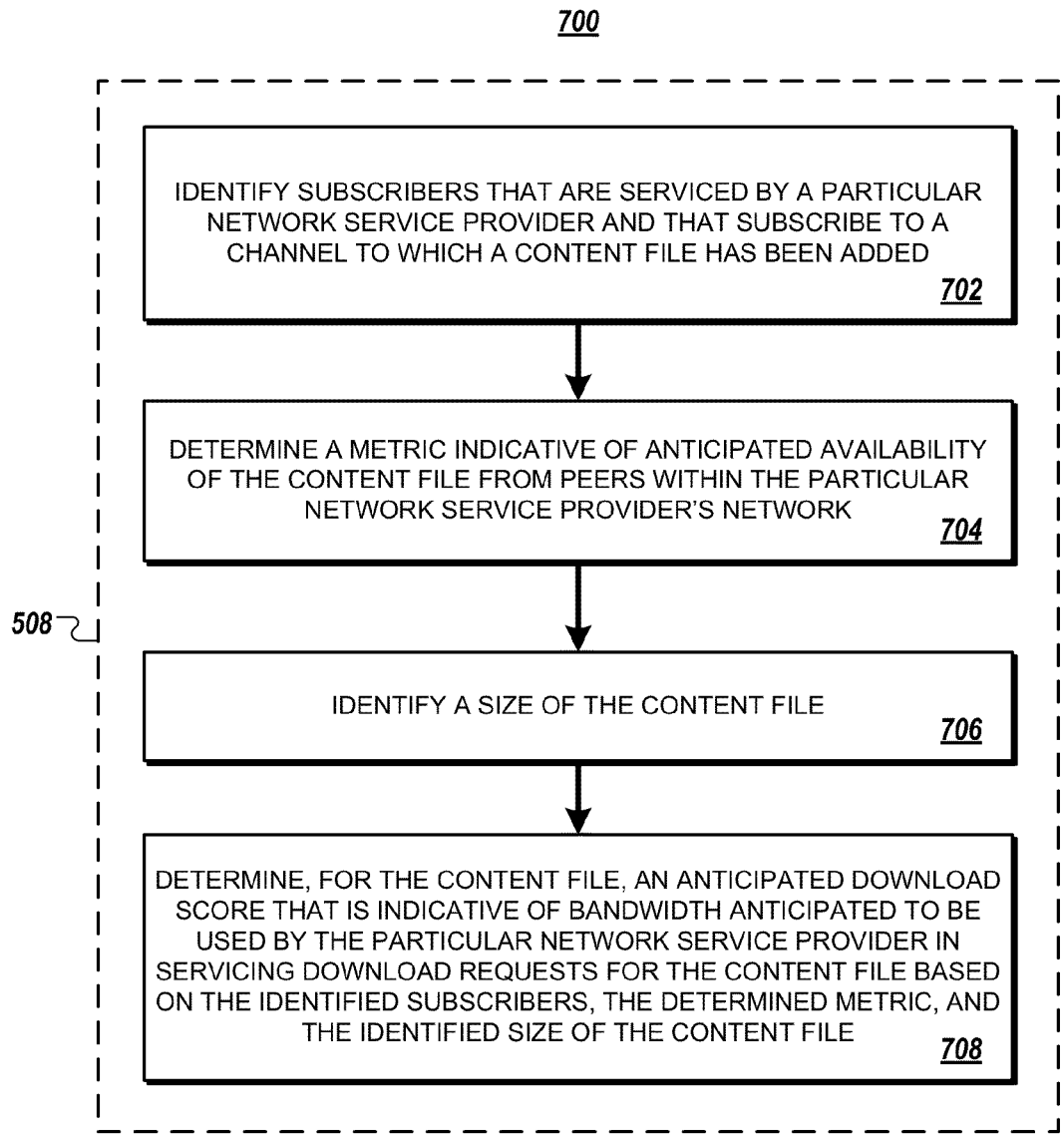

FIG. 7 illustrates a process 700 for determining anticipated download scores. The process 700 may be used in determining anticipated download scores referenced above with respect to reference numeral 508. The operations of the process 700 are described generally as being performed by the system 200. The operations of the process 700 may be performed by one of the components of the system 200 (e.g., the server system 210) or may be performed by a combination of the components of the system 200. In some implementations, operations of the process 700 may be performed by one or more processors included in one or more electronic devices.

The system 200 identifies subscribers that are serviced by a particular network service provider and that subscribe to a channel to which a content file has been added (702). For example, for a particular network service provider, a count of the total number of subscribers serviced by that network service provider and a count of the number of those subscribers who subscribe to a channel to which a content file has been added may be determined.

A content file may have been added to a regional channel. That is, some channels may have a mostly local or regional audience (e.g., the content for such a channel may be intended for subscribers of a particular region). For such a regional channel, a network service provider which services end users living in that region may have a higher subscriber count of subscribers who subscribe to the regional channel than a network service provider which does not serve end users living in that region.

The system 200 determines a metric indicative of anticipated availability of the content file from peers within the particular network service provider's network (704). For example, the metric may be determined based on querying historical logs which may indicate a percentage of download requests for the content file that were serviced from peers within the particular network service providers network (e.g., as compared to requests serviced from a proxy cache, an external peer, or a content and directory database (e.g., direct downloads from the content and directory database 310)).

The system 200 identifies a size of the content file (706). The size of a content file may be the size that the content file occupies in storage. The size may be determined, for example, by querying metadata associated with the file. The size may also be determined by querying a database system for the size of database content associated with the content file or by querying a file system for a file attribute which indicates the size of the content file. As another example, the size of the content file may be computed by processing the file.

The system 200 determines, for the content file, an anticipated download score that is indicative of bandwidth anticipated to be used by the particular network service provider in servicing download requests for the content file based on the identified subscribers, the determined metric, and the identified size of the content file (708). As an example, suppose that the content file has been added to a regional channel and that a first network service provider services end users living in a region associated with the regional channel and a second network service provider does not service end users living in the region associated with the regional channel. The number of users (e.g., ten thousand) serviced by the first network service provider who subscribe to the channel which includes the content file may be higher than the number of users (e.g., two hundred) serviced by the second network service provider who subscribe to the channel which includes the content file. In this example, the anticipated download score for the first network service provider may be higher than the anticipated download score for the second network service provider.

In general, the anticipated download score for the content file and a particular network service provider increases as the anticipated number of subscribers serviced by that particular network service provider and who subscribe to the channel which includes that content file increases. Similarly, the anticipated download score for a content file may increase as the size of the file increases. In contrast, an anticipated download score for the content file and a particular network service provider may decrease as the metric indicative of anticipated availability of the content file from peers within the particular network service provider's network increases. In other words, the more likely a content file is to be serviced from a peer media player/downloader device within the particular network service provider's network, the less likely the download request for the content file will increase bandwidth usage on the network service provider's network (e.g., as compared to bandwidth usage incurred if the request is serviced by a proxy cache, by retrieving the content file from an external peer, or by downloading the content file from a content and directory database (e.g., the content and directory database 310)).

An anticipated download score for a content file may be based on other factors. For example, attributes of a channel to which the content file has been added and/or attributes of the content curator who defined the channel may be considered when determining an anticipated download score. For example, anticipated download scores for content files included in popular channels or in channels defined by popular content curators (e.g., even if the channel is a newly created channel) may be higher than anticipated download scores for content files included in unpopular channels. A channel or content curator may be considered a popular channel, for example, based on a total number of subscribers. As another example, an anticipated download score for a content file may be based on a subscriber ranking of the channel the content file is included in and/or a subscriber ranking of the content curator who defined the channel, with content files associated with higher channel or content curator rankings having higher anticipated download scores than content files associated with lower channel or content curator user rankings.

Returning to FIG. 5, the system 200 determines, for each of multiple content files, a cache benefit score based on the actual download score for the corresponding content file and/or the anticipated download score for the corresponding content file (510). In some implementations, when determining a cache benefit score for a content file, a weight associated with an actual download score associated with the content file is the same as a weight associated with an anticipated download score associated with the content file. In some implementations, a weight associated with the actual download score for a content file may be higher than a weight associated with the anticipated download score for a content file, and in other implementations, a weight associated with the anticipated download score for a content file may be higher than a weight associated with the actual download score for a content file. In other words, in some implementations, a cache benefit score may be calculated as a simple sum of a corresponding actual download score and a corresponding anticipated download score. In other implementations, a calculation more complex than a simple sum may be performed. In some implementations, cache benefit scores may be periodically updated. For example, cache benefit scores for content files may be calculated (or recalculated) on a hourly, daily, or weekly basis. The cache benefit scores also may be updated when relatively high periods of download activity are detected. The cache benefit scores further may be updated in as to close real-time as possible, so that the cache is constantly updating to store the most relevant content to facilitate the best performance.

The system 200 selects content files to include in the proxy cache based on the determined cache benefit scores (512). For example, the system 200 may access, from electronic storage, a threshold cache benefit score, and may compare each of the determined cache benefit scores to the accessed threshold cache benefit score. The system 200 may determine whether each of the determined cache benefit scores indicates a cache benefit that exceeds a cache benefit indicated by the accessed threshold cache benefit score and may select one or more content files having a cache benefit score that indicates a cache benefit that exceeds a cache benefit indicated by the accessed threshold cache benefit score. As another example, the system 200 may identify, from among the multiple content files for which a cache benefit score was determined, a threshold number of content files (e.g., one hundred) having cache benefit scores that indicate a highest cache benefit and may select the threshold number of content files having cache benefit scores that indicate a highest cache benefit.

Figure 8:
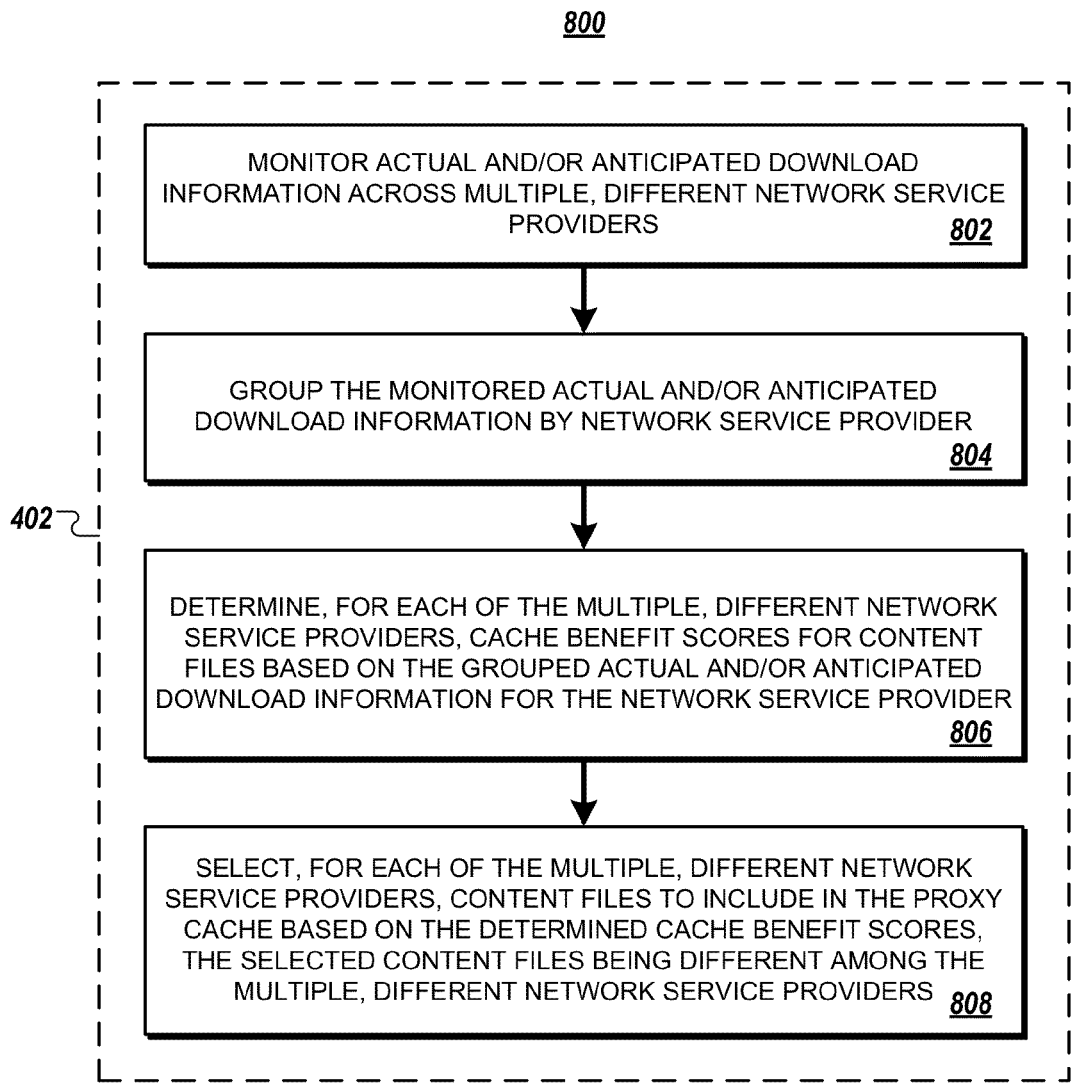

FIG. 8 illustrates another example process 800 for determining a subset of content files to include in a proxy cache. The process 800 may be used in determining a subset of content files to include in a proxy cache referenced above with respect to reference numeral 402. The operations of the process 800 are described generally as being performed by the system 200. The operations of the process 800 may be performed by one of the components of the system 200 (e.g., the server system 210) or may be performed by a combination of the components of the system 200. In some implementations, operations of the process 800 may be performed by one or more processors included in one or more electronic devices.

The system 200 monitors actual and/or anticipated download information across multiple, different network service providers (802). As mentioned above, a network service provider may be associated with or may serve subscribers in a particular region. A particular region may be serviced by more than one network service provider. Some network service providers may service multiple regions, or may service all of multiple regions included in an area serviced by a content delivery network. For each network service provider associated with a content delivery network, actual and/or anticipated download information may be monitored and may be stored, for example in a database of a network server system.

Figure 9:
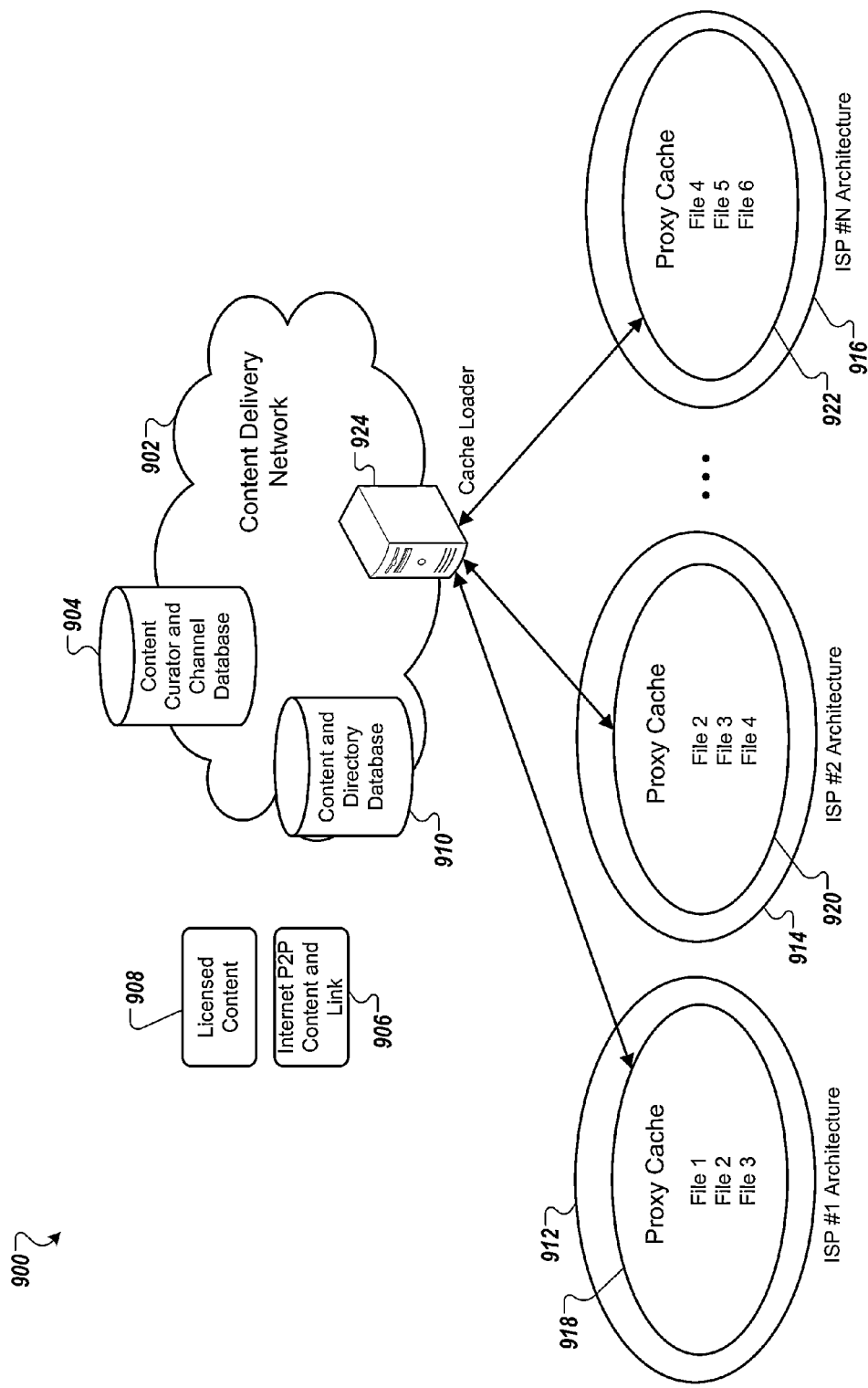

For example, FIG. 9 illustrates an example system 900 which includes multiple network service providers. The system 900 includes a content delivery network 902 through which content is delivered to subscribers. Subscribers may subscribe to one or more channels. Channel information, such as channel definitions and supplementary channel information, may be stored in a content curator and channel database 904. Channel content may include, among other content, Internet content 906 and licensed content 908. Channel content may be stored in a content and directory database 910.

Content may be delivered to end users using the content delivery network 902 and one of multiple network service providers 912, 914, 916 (e.g., ISP one, ISP two, ISP N). Each network service provider 912, 914, 916 includes a respective proxy cache 918, 920, 922. A cache loader 924 may send content to the proxy caches 918, 920, and 922.

Returning to FIG. 8, the system 200 groups the monitored actual and/or anticipated download information by network service provider (804). For example, the monitored actual and/or anticipated download information may be grouped by a network service provider identifier field in a database system. For instance, in the example of FIG. 9, actual and/or anticipated download information for the network service providers 912, 914, 916 may be grouped by a network service provider identifier database field and stored in the content and directory database 910 and/or in the cache loader 924.

The system 200 determines, for each of the multiple, different network service providers, cache benefit scores for content files based on the grouped actual and/or anticipated download information for the network service provider (806). For instance, in the example of FIG. 9, for each content file included in the content and directory database 910, the cache loader 924 may determine a cache benefit score for the content file for each of the network service providers 912, 914, 916 and may store the determined cache benefit scores in the content and directory database 910 and/or in the cache loader 924.

The system 200 selects, for each of the multiple, different network service providers, content files to include in the proxy cache based on the determined cache benefit scores, the selected content files being different among the multiple, different network service providers (808). For example, the system 200 may access, from electronic storage, a threshold cache benefit score, and may compare each of the determined cache benefit scores to the accessed threshold cache benefit score, where each of the determined cache benefit scores is associated with a content file and with a network service provider. The system 200 may determine whether each of the determined cache benefit scores indicates a cache benefit that exceeds a cache benefit indicated by the accessed threshold cache benefit score. If a cache benefit score indicates a cache benefit that exceeds a cache benefit indicated by the accessed threshold cache benefit score, the content file associated with the cache benefit score may be stored in a proxy cache of the network service provider associated with the cache benefit score.

For instance, in the example of FIG. 9, a content file "File 1" is included in the proxy cache 918 of the network service provider 912 but is not included in the proxy caches 920, 922 of the network service providers 914, 916, which may be because a cache benefit score associated with the content file "File 1" and the network service provider 912 exceeded a threshold while cache benefit scores associated with the content file "File 1" and the network service provider 914 or 916 did not exceed a threshold. For example, the content file "File 1" may be included in a regional channel, where a majority of subscribers subscribing to the regional channel live in an area serviced by the network service provider 912. The network service providers 914, 916, for example, might not service users who live in the region associated with the regional channel. The network service provider 912 may service a relatively large number of subscribers who subscribe to the channel which includes the content file "File 1", so actual and anticipated download scores for the content file "File 1" may be higher for the network service provider 912 than for the network service providers 914, 916, who have a smaller number of subscribers (possibly zero) for the channel which includes the content file "File 1".

A content file may be included in the proxy cache of more than one network service provider. For example, the content files "File 2" and "File 3" are each included in both the proxy cache 918 of the network service provider 912 and in the proxy cache 920 of the network service provider 914. As another example, the content file "File 4" is included in both the proxy cache 920 of the network service provider 914 and in the proxy cache 922 of the network service provider 916. Although the example of FIG. 9 illustrates three content files included in each proxy cache 918, 920, 922, the number of content files in each proxy cache may be different for each proxy cache, and may be a much higher number of content files.

In some examples, a threshold number of content files may be included in each proxy cache. For example, a threshold number (e.g., one hundred) may be accessed from electronic storage. For each network service provider, the top threshold number of cache benefit scores indicating the highest cache benefit may be determined, and the content files associated with each of the determined cache benefit scores may be stored in the proxy cache of the network service provider. For instance, in the example of FIG. 9, a threshold number of three content files may have been determined, resulting in three content files stored in each of the proxy caches 918, 920, 922. For example, the top three cache benefit scores for the network service provider 912 may be associated with content files "File 1", "File 2", and "File 3", while the top three cache benefit scores for the network service provider 914 may be associated with content files "File 2", "File 3", and "File 4" and the top three cache benefit scores for the network service provider 916 may be associated with content files "File 4", "File 5", and "File 6".

Returning to FIG. 4, the system 200 controls the network service provider to store the subset of content files in the proxy cache (404). For instance, in the example of FIG. 3, the cache loader 316 may retrieve the subset of content files from the content and directory database 310 and may send the subset to the proxy cache 314, over the content delivery network, or over another network, such as the Internet.

Figure 10:
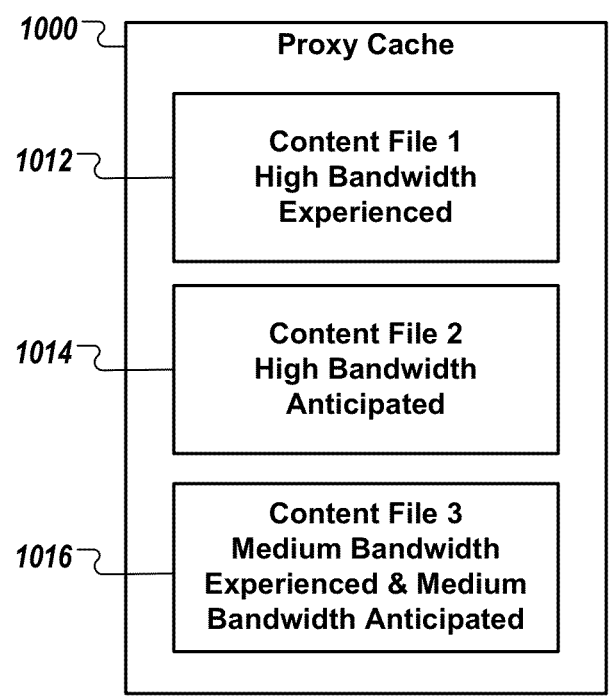
FIGS. 10 and 14 are diagrams of exemplary proxy caches.

FIG. 10 illustrates an example proxy cache 1000. The proxy cache 1000 includes content files 1012, 1014, 1016. The content file 1012 may have been selected because of high experienced bandwidth (e.g., high actual download score). The content file 1014 may have been selected because of high anticipated bandwidth (e.g., high anticipated download score). The content file 1016 may have been selected due to a combination of medium experienced and medium anticipated bandwidth (e.g., medium actual and medium anticipated download scores).

Returning to FIG. 4, the system 200 controls the user media player/downloader devices to attempt to use the proxy cache as a peer to download a content file prior to using an external peer accessible, to the user media player/downloader devices, on an external network through the network service provider (406). In some implementations, an internal peer may be used prior to using the proxy cache or an external peer. Downloading from internal peers, proxy caches and external peers is described in more detail below with respect to FIG. 11.

Figure 11:
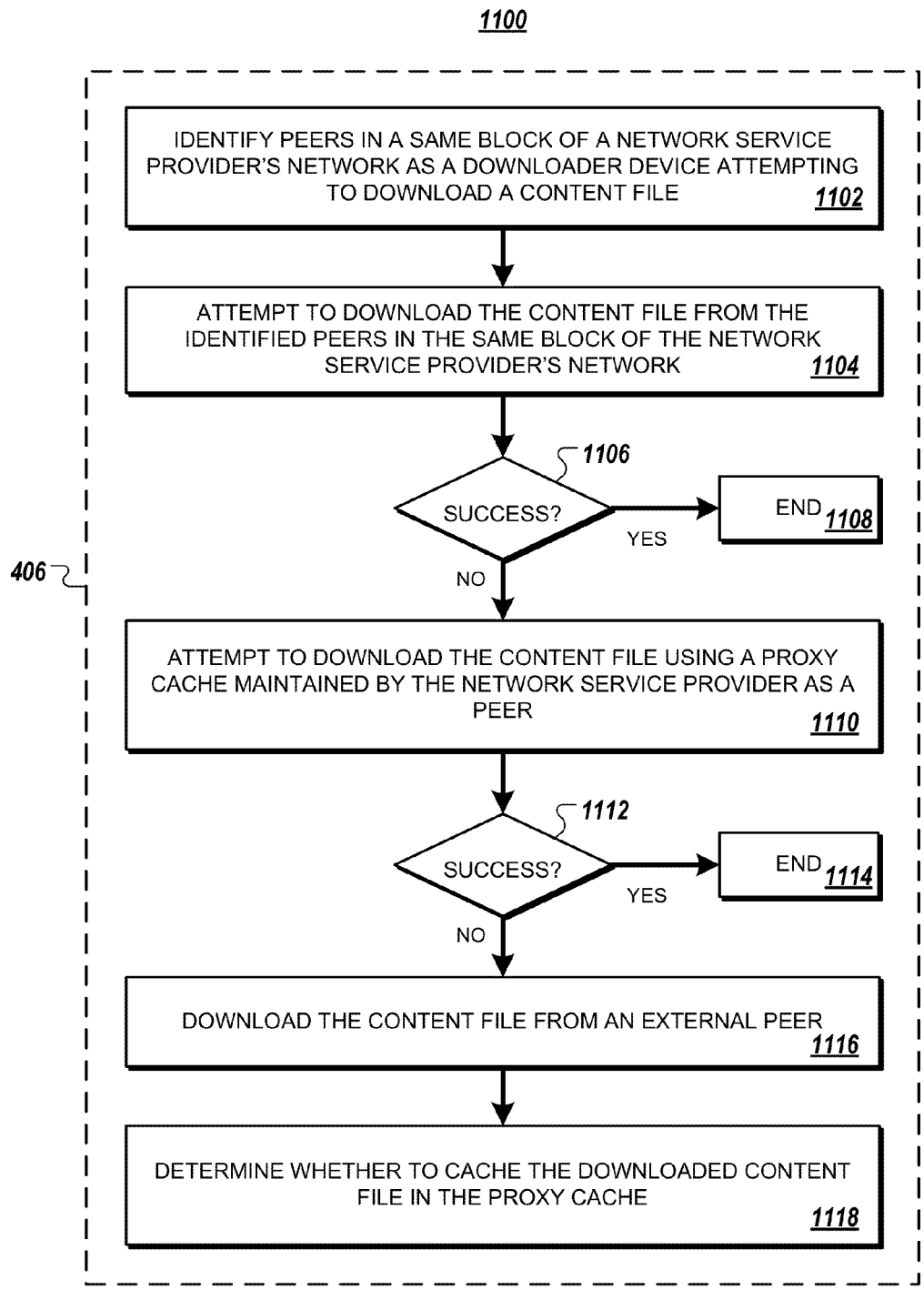

FIG. 11 illustrates a process 1100 for controlling user media player/downloader devices. The process 1100 may be used in controlling the user media player/downloader devices referenced above with respect to reference numeral 406. The operations of the process 1100 are described generally as being performed by the system 200. The operations of the process 1100 may be performed by one of the components of the system 200 (e.g., the server system 210) or may be performed by a combination of the components of the system 200. In some implementations, operations of the process 1100 may be performed by one or more processors included in one or more electronic devices.

Figure 12:
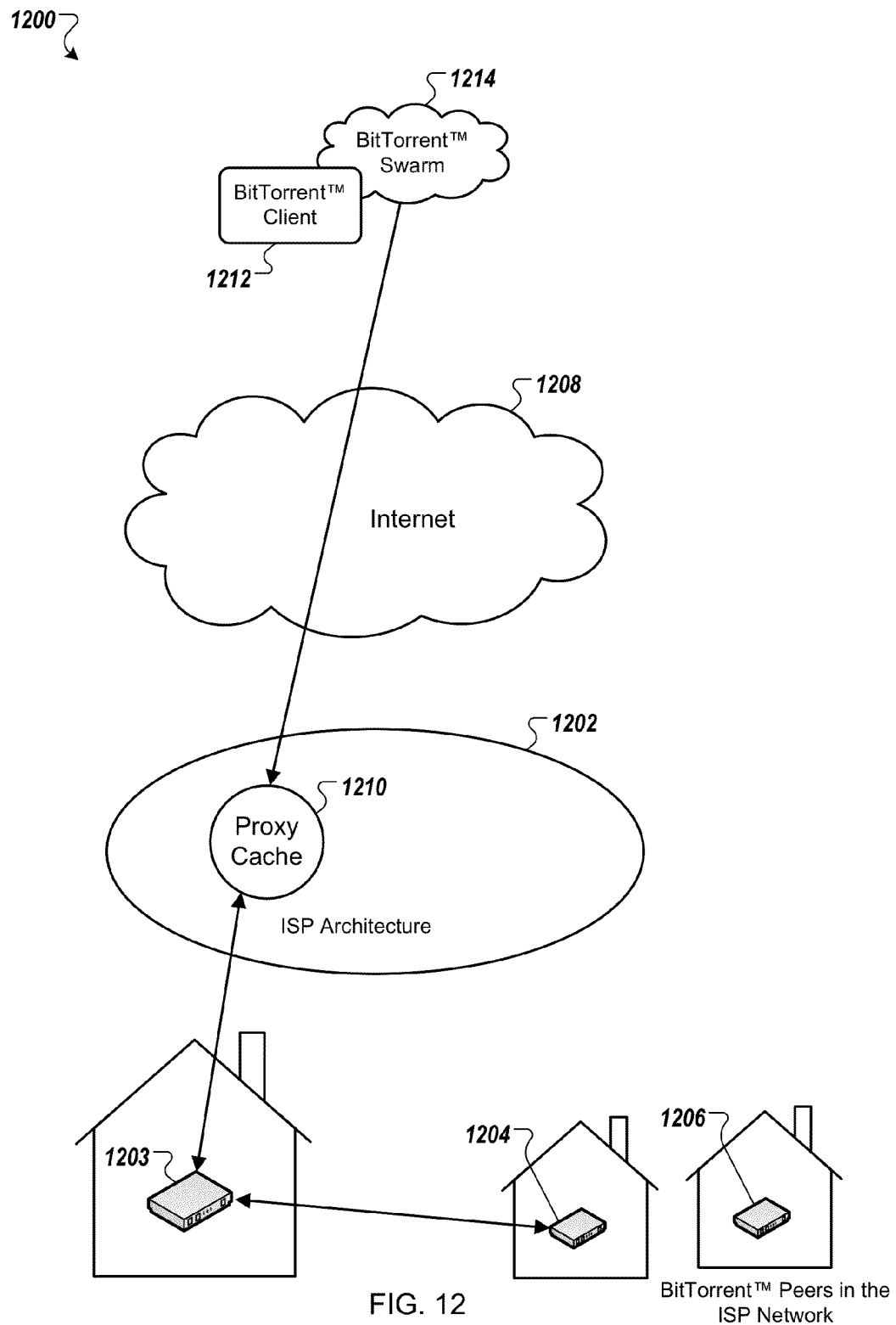

The system 200 identifies peers in a same block of a network service provider's network as a media player/downloader device attempting to download a content file (1102). For example, FIG. 12 illustrates a system 1200 which includes a network service provider network 1202. A media player/downloader device 1203 is in the same block of the network service provider 1202 as media player/downloader device peers 1204 and 1206.

Returning to FIG. 11, the system 200 attempts to download the content file from the identified peers in the same block of the network service provider's network (1104). For instance, in the example of FIG. 12, the media player/downloader device 1203 may attempt to download a content file from either the peer media player/downloader device 1204 or the peer media player/downloader device 1206.

The system 200 determines whether the download of the content file from the identified peers in the same block of the network service provider's network was successful (1106). For instance, in the example of FIG. 12, the media player/downloader device 1203 may determine that the download of the content file from a peer is unsuccessful if, for example, the content file is unavailable from both the media player/downloader device 1204 and the media player/downloader device 1206. As another example, the media player/downloader device 1203 may determine that an attempt to download the content file from the peer media player/downloader device 1204 or the peer media player/downloader device 1206 was unsuccessful (e.g., due to a communications failure). As yet another example, the media player/downloader device 1203 may determine that an attempt to download the content file from either the peer media player/downloader device 1204 or the peer media player/downloader device 1206 was successful (e.g., due to an indication of a successful file transfer).

If the download of the content file from the identified peers in the same block of the network service provider's network was successful, the process 1100 ends (1108). If the download of the content file from the identified peers in the same block of the network service provider's network was not successful, the system 200 attempts to download the content file using a proxy cache maintained by the network service provider as a peer (1110). For instance, in the example of FIG. 12, the media player/downloader device 1203 may attempt to download the content file from a proxy cache 1210 associated with the network service provider 1202.

The system 200 determines whether the download of the content file using a proxy cache maintained by the network service provider as a peer was successful (1112). For instance, in the example of FIG. 12, a cache loader server may inform the media player/downloader device 1203 whether the content file is available in the proxy cache 1210. As another example, the media player/downloader device 1203 may determine whether a download of the content file from the proxy cache 1210 was successful.

If the download of the content file using a proxy cache maintained by the network service provider as a peer was successful, the process 1100 ends (1114). If the download of the content file using a proxy cache maintained by the network service provider as a peer was not successful, the system 200 downloads the content file from an external peer (1116). For instance, in the example of FIG. 12, the content file may be downloaded, over the Internet 1208, from an external BitTorrent™ client 1212 included in a BitTorrent™ swarm 1214, where the BitTorrent™ client 1212 is outside of the network serviced by the network service provider 1202.

The system 200 determines whether to cache the downloaded content file in the proxy cache (1118). For example, a cache benefit score associated with the content file and with the network service provider 1202 may be determined, and if the determined cache benefit score is greater than a threshold cache benefit score, the content file may be stored in the proxy cache 1210, so that future download requests for the content file may be serviced from the proxy cache 1210 rather than the BitTorrent™ client 1212.

Figure 13:
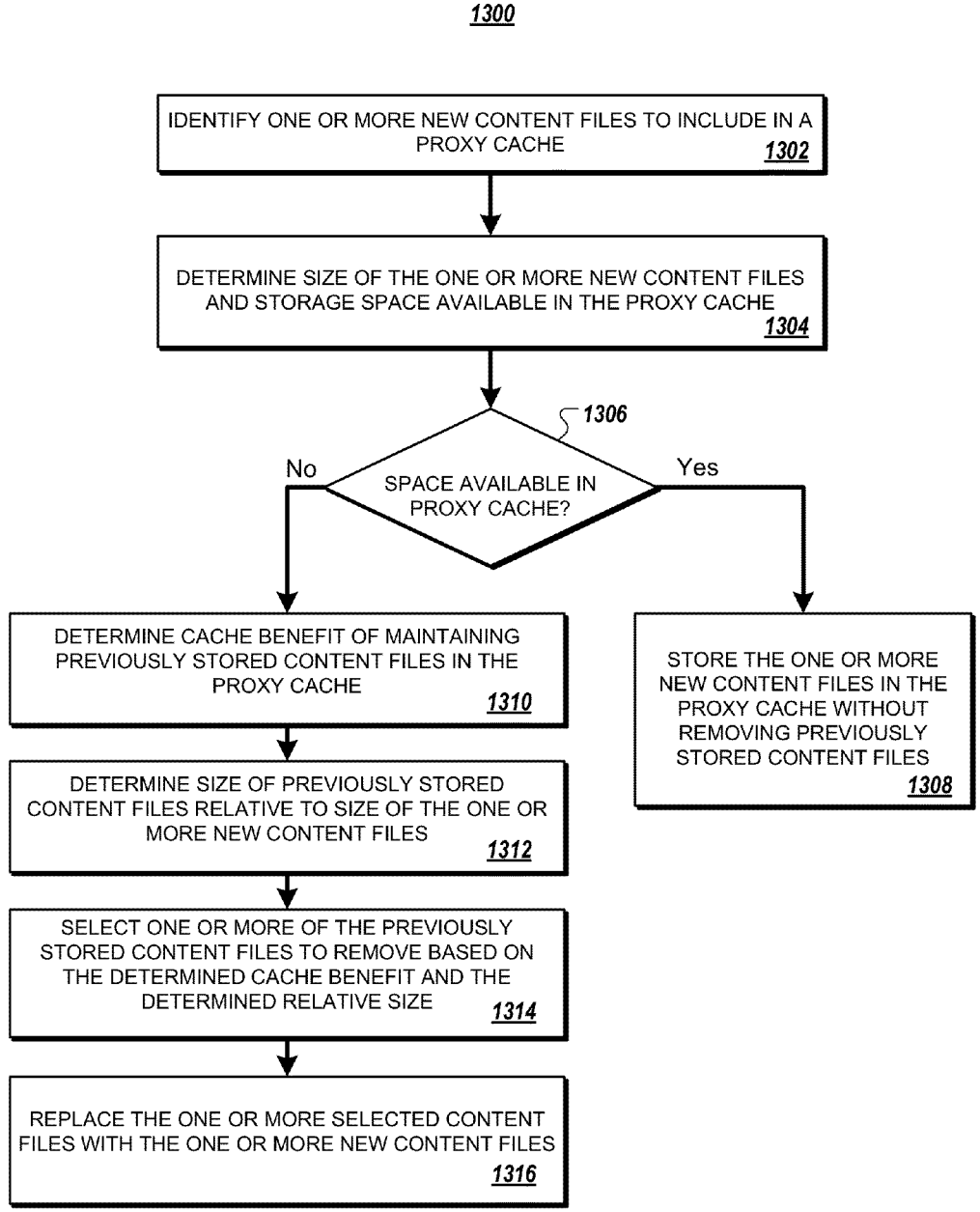

FIG. 13 illustrates a process 1300 for managing proxy cache content. The operations of the process 1300 are described generally as being performed by the system 200. The operations of the process 1300 may be performed by one of the components of the system 200 (e.g., the server system 210) or may be performed by a combination of the components of the system 200. In some implementations, operations of the process 1300 may be performed by one or more processors included in one or more electronic devices.

The system 200 identifies one or more new content files to include in a proxy cache (1302). For example, one or more content files may be identified in response to determined cache benefit scores associated with the content file(s) being greater than a threshold.

The system 200 determines the size of the one or more new content files and storage space available in the proxy cache (1304). The size of a content file may be the size that the content file occupies in storage. The size may be determined, for example, by querying metadata associated with the file. The size may also be determined by querying a database system for the size of database content associated with the content file or by querying a file system for a file attribute which indicates the size of the content file. As another example, the size of the content file may be computed by processing the file. The storage space available in the proxy cache may be determined, for example, by querying a space-available setting which is maintained as content files are added and removed from the proxy cache. As another example, the storage space available in the proxy cache may be determined by determining the amount of space occupied by the content files currently in the cache and subtracting that amount from the total storage capacity of the proxy cache.

The system 200 determines whether space is available in the proxy cache to accommodate the one or more content files (1306). For example, the system 200 may compare the determined storage size of the one or more content files to the determined amount of storage space available in the proxy cache. If the determined storage size of the one or more content files is less than or equal to the amount of storage space available in the proxy cache, the system 200 may determine that space is available in the proxy cache to accommodate the one or more content files. If the determined storage size of the one or more content files is greater than the amount of storage space available in the proxy cache, the system 200 may determine that space is not available to store some or all of the one or more content files.

If space is available in the proxy cache, the system 200 stores the one or more new content files in the proxy cache without removing previously stored content files (1308). For example, a cache loader server may transfer the one or more content files to the proxy cache.

Figure 14:
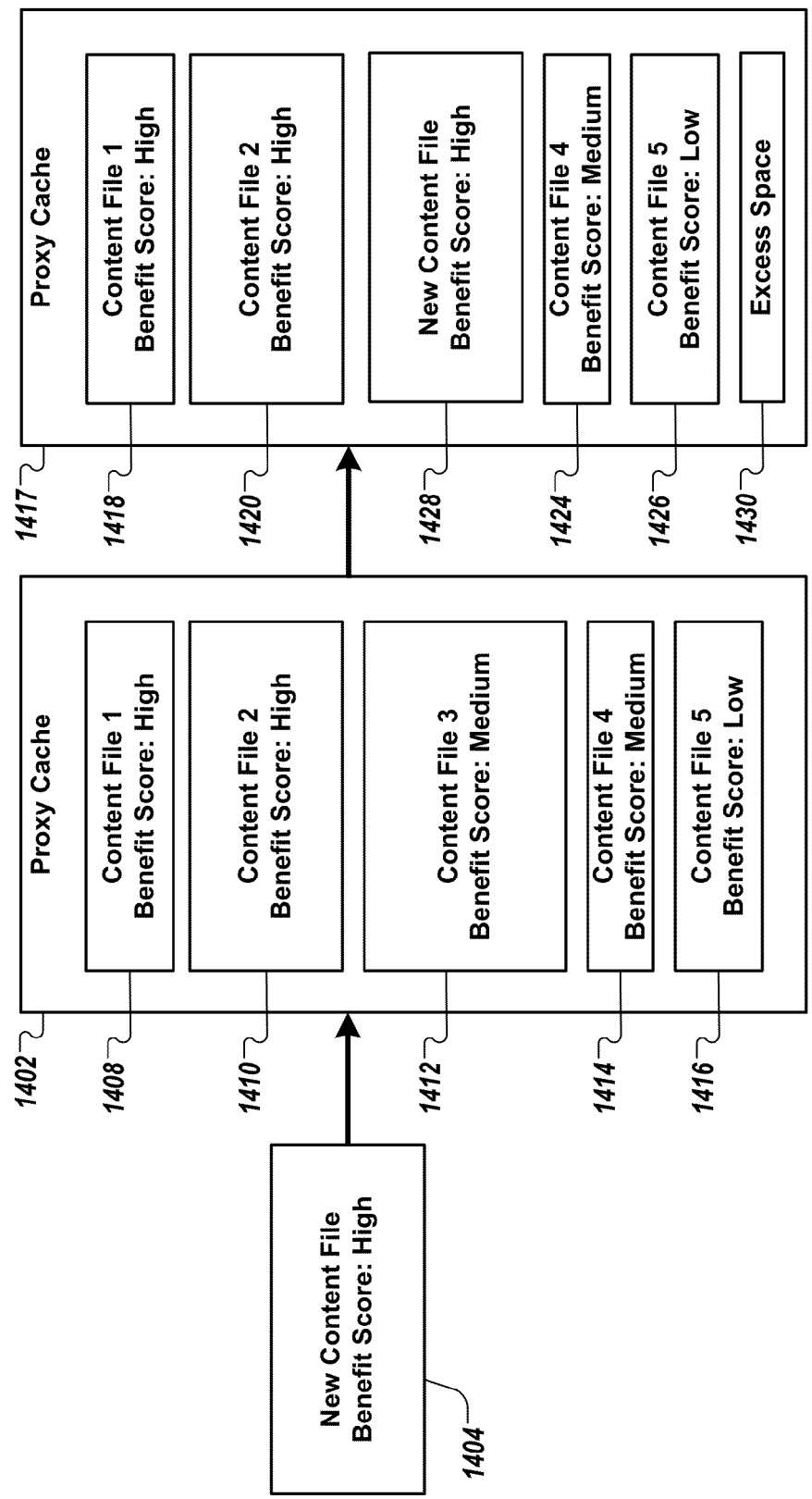

If space is not available in the proxy cache, the system 200 determines the cache benefit of maintaining previously stored content files in the proxy cache (1310). For example, FIG. 14 illustrates an example proxy cache 1402 and a content file 1404 to add to the proxy cache 1402. The cache benefit associated with adding the content file 1404 to the proxy cache has been determined to be high. The proxy cache 1402 includes previously stored content files 1408, 1410, 1412, 1414, 1416. The cache benefit of maintaining content files 1408, 1410 in the proxy cache 1402 has been determined to be high, while the cache benefit of maintaining content files 1412, 1414 has been determined to be medium and the cache benefit of maintaining the content file 1416 has been determined to be low.

Returning to FIG. 13, the system 200 determines the size of previously stored content files relative to the size of the one or more new content files (1312). For example, as illustrated in FIG. 14, the previously stored content file 1412 is larger than the new content file 1404 and the previously stored content files 1414, 1416 are each smaller than the new content file 1404.

The system 200 selects one or more of the previously stored content files to remove based on the determined cache benefit and the determined relative size (1314). For instance, in the example of FIG. 14, a consideration may be made to remove the content file 1416 since it has a lower cache benefit score than the new content file 1404. However, removing the previously stored content file 1416 does not create enough space to make room for the new content file 1404. One approach may be to remove both the previously stored content files 1414 and 1416. Another approach may be to remove only the previously stored content file 1412 (e.g., since the content file 1412 is larger than the new content file 1404). It may be determined that removing one content file with a medium cache benefit (e.g., content file 1412) is preferred over removing two smaller content files (e.g., content files 1414, 1416). Specifically, the cache benefit of maintaining both the content files 1414 and 1416 may outweigh the cache benefit of maintaining the content file 1412 alone.

The system 200 replaces the one or more selected content files with the one or more new content files (1316). For instance, in the example of FIG. 14, a modified proxy cache 1417 is shown which illustrates the effects of removing the content file 1412 from the proxy cache 1402 and adding the content file 1404 to the proxy cache 1402. Content files 1408, 1410, 1414, and 1416 from the proxy cache 1402 are maintained in the modified proxy cache 1417, as illustrated by content files 1418, 1420, 1422, 1424, 1426. The new content file 1404 has been added to the proxy cache 1417, as illustrated by content file 1428. The proxy cache 1417 includes excess space 1430 (e.g., accounting for the difference in size between the new content file 1404 and the removed content file 1412). The excess space may be used to store another content file in the proxy cache either by itself or in combination with removal of one of the content files stored in the proxy cache.

Figure 15:
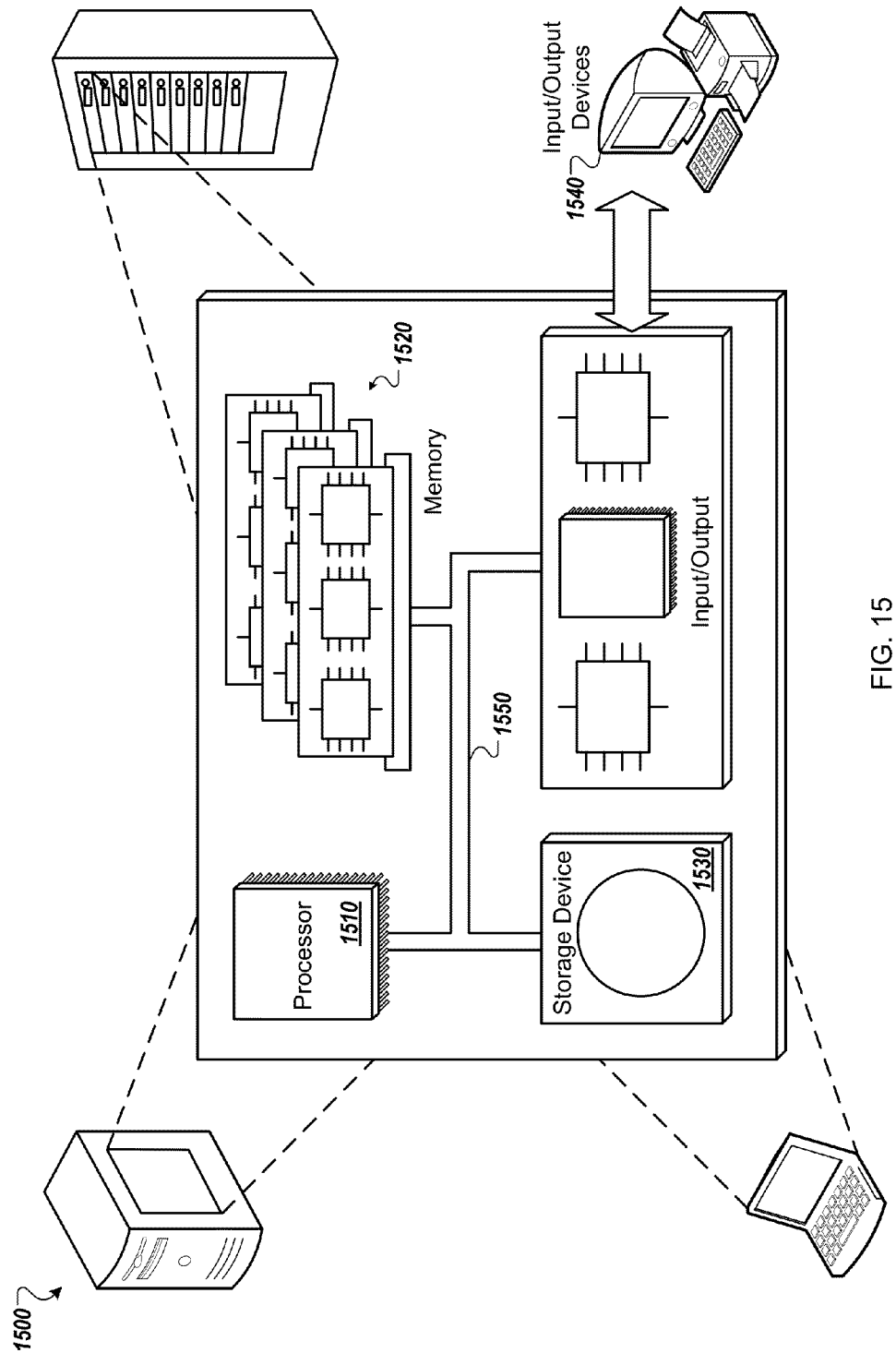

FIG. 15 is a schematic diagram of an example of a generic computer system 1500. The system 1500 can be used for the operations described in association with the processes 400, 500, 600, 700, 800, 1100, and 1300, according to one implementation. For example, the system 1500 may be included in either or all of the server system 210 and the server 216.

The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In one implementation, the processor 1510 is a single-threaded processor. In another implementation, the processor 1510 is a multi-threaded processor. The processor 1510 is capable of processing instructions stored in the memory 1520 or on the storage device 1530 to display graphical information for a user interface on the input/output device 1540.

The memory 1520 stores information within the system 1500. In one implementation, the memory 1520 is a computer-readable medium. In one implementation, the memory 1520 is a volatile memory unit. In another implementation, the memory 1520 is a non-volatile memory unit.

The storage device 1530 is capable of providing mass storage for the system 1500. In one implementation, the storage device 1530 is a computer-readable medium. In various different implementations, the storage device 1530 may be a floppy disk device, a hard disk device, an optical disk device, or a tape device.

The input/output device 1540 provides input/output operations for the system 1500. In one implementation, the input/output device 1540 includes a keyboard and/or pointing device. In another implementation, the input/output device 1540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method of controlling a media device to access content from a cache, the method comprising:

determining, for each of multiple content files, a metric indicative of anticipated availability of the corresponding content file from an internal peer that is within a network of a network service provider, the network service provider using less bandwidth to service content requests to internal peers that are within the network of the network service provider as compared to servicing content requests to external peers that are outside of the network of the network service provider;

determining, for each of the multiple content files, a cache benefit score based on the determined metric indicative of anticipated availability of the corresponding content file from an internal peer that is within the network of the network service provider;

determining, based on the cache benefit score determined for each of the of the multiple content files, a subset of the multiple content files to include in a proxy cache maintained by the network service provider that provides network service to a user media device included in a content delivery network;

controlling the network service provider to store the subset of content files in the proxy cache; and controlling the user media device to attempt to use the proxy cache as a peer to access a content file prior to using an external peer that is outside of the network of the network service provider and accessible, to the user media device, on an external network through the network service provider, wherein determining, for each of the multiple content files, the metric indicative of anticipated availability of the corresponding content file from an internal peer that is within the network of the network service provider comprises:

determining, for each of the multiple content files, a percentage of access requests for the corresponding content file that were serviced from an external peer that is outside of the network of the network service provider relative to access requests for the corresponding content file that were serviced from the proxy cache maintained by the network service provider, from an internal peer that is inside of the network of the network service provider, and from a content and directory database; and based on the determined percentage of access requests for the corresponding content file that were serviced from an external peer that is outside of the network of the network service provider, determining, for each of the multiple content files, the metric indicative of anticipated availability of the corresponding content file from an internal peer that is within the network of the network service provider.

2. The method of claim 1 wherein determining the cache benefit score for each of the of the multiple content files comprises:

monitoring access requests of multiple, different user media devices serviced by the network service provider;

based on the monitoring of the access requests of multiple, different user media devices, determining, for each of the multiple content files, an actual access score that is indicative of bandwidth being used in servicing access requests for the corresponding content file; and determining the cache benefit score for each of the of the multiple content files based on the determined actual access scores.

3. The method of claim 2 wherein determining, for each of the multiple content files, the actual access score that is indicative of bandwidth being used in servicing access requests for the corresponding content file comprises:

determining, for each of the multiple content files, a frequency of requests for the corresponding content file received from media devices;

identifying, for each of the multiple content files, a size of the corresponding content file; and determining, for each of the multiple content files, an actual access score that is indicative of bandwidth being used in servicing access requests for the corresponding content file based on the determined frequency and the identified size of the corresponding content file.

4. The method of claim 3:

wherein determining, for each of the multiple content files, the frequency of requests for the corresponding content file received from media devices comprises:

identifying, for each of the multiple content files and from among access requests received from media devices serviced by multiple, different network service providers, access requests for the corresponding content file received from media devices serviced by a particular network service provider, and determining, for each of the multiple content files, an access frequency of the identified access requests for the corresponding content file received from media devices serviced by the particular network service provider; and wherein determining, for each of the multiple content files, the actual access score that is indicative of bandwidth being used in servicing access requests for the corresponding content file based on the determined frequency and the identified size of the corresponding content file comprises:

determining, for each of the multiple content files, an actual access score that is indicative of bandwidth being used by the particular network service provider in servicing access requests for the corresponding content file based on the determined access frequency of the identified access requests and the identified size of the corresponding content file.

5. The method of claim 4 wherein determining, for each of the multiple content files, the access frequency of the identified access requests for the corresponding content file received from media devices serviced by the particular network service provider comprises:

determining, for each of the identified access requests, a type of peer handling the corresponding access request, the type of peer including at least one of an internal peer that is within a network of the particular network service provider and an external peer that is outside of the network of the particular network service provider; and determining, for each of the multiple content files, an external access frequency of the identified access requests for the corresponding content file received from media devices serviced by the particular network service provider based on the identified access requests and the determination of the type of peer handling each of the identified access requests, the determination of the external access frequency placing a higher value on access requests for which the type of peer handling the corresponding access request was determined to be an external peer than access requests for which the type of peer handling the corresponding access request was determined to be an internal peer.

6. The method of claim 1 wherein determining the cache benefit score for each of the of the multiple content files comprises:

monitoring additions of content files to channels offered by the content delivery network;

based on the monitoring of the additions of content files to channels offered by the content delivery network, determining, for each of the multiple content files, an anticipated access score indicative of bandwidth anticipated to be used in servicing access requests for the corresponding content file; and determining the cache benefit score for each of the of the multiple content files based on the determined anticipated access scores.

7. The method of claim 6 wherein determining, for each of the multiple content files, the anticipated access score that is indicative of bandwidth anticipated to be used in servicing access requests for the corresponding content file comprises:

identifying, for each of the multiple content files, subscribers that are serviced by a particular network service provider and that subscribe to a channel to which the corresponding content file has been added;

identifying, for each of the multiple content files, a size of the corresponding content file; and determining, for each of the multiple content files, an anticipated access score that is indicative of bandwidth anticipated to be used by the particular network service provider in servicing access requests for the corresponding content file based on the identified subscribers that subscribe to the channel to which the corresponding content file has been added and the identified size of the corresponding content file.

8. The method of claim 7 wherein determining, for each of the multiple content files, the anticipated access score that is indicative of bandwidth anticipated to be used by the particular network service provider in servicing access requests for the corresponding content file based on the identified subscribers that subscribe to the channel to which the corresponding content file has been added and the identified size of the corresponding content file comprises:

determining, for each of the multiple content files, an anticipated access score that is indicative of bandwidth anticipated to be used by the particular network service provider in servicing access requests for the corresponding content file based on the identified subscribers that subscribe to the channel to which the corresponding content file has been added, the identified size of the corresponding content file, and the determined metric indicative of anticipated availability of the corresponding content file from an internal peer.

9. The method of claim 1 wherein determining the cache benefit score for each of the of the multiple content files comprises:

monitoring access requests of multiple, different user media devices serviced by the network service provider;

based on the monitoring of the access requests of the multiple, different user media devices serviced by the network service provider, determining, for each of the multiple content files, an actual access score that is indicative of bandwidth being used in servicing access requests for the corresponding content file;

monitoring additions of content files to channels offered by the content delivery network;

based on the monitoring of the additions of content files to channels offered by the content delivery network, determining, for each of the multiple content files, an anticipated access score that is indicative of bandwidth anticipated to be used in servicing access requests for the corresponding content file; and determining, for each of the multiple content files, a cache benefit score based on the actual access score for the corresponding content file and the anticipated access score for the corresponding content file.

10. The method of claim 9 wherein determining, based on the cache benefit score determined for each of the of the multiple content files, the subset of the multiple content files to include in the proxy cache maintained by the network service provider comprises:
  accessing, from electronic storage, a threshold cache benefit score;
  comparing each of the determined cache benefit scores to the accessed threshold cache benefit score;
  determining whether each of the determined cache benefit scores indicates a cache benefit that exceeds a cache benefit indicated by the accessed threshold cache benefit score; and
  based on determination results, selecting one or more content files having a cache benefit score that indicates a cache benefit that exceeds a cache benefit indicated by the accessed threshold cache benefit score.

11. The method of claim 9 wherein determining, based on the cache benefit score determined for each of the of the multiple content files, the subset of the multiple content files to include in the proxy cache maintained by the network service provider comprises:
  identifying, from among the multiple content files for which a cache benefit score was determined, a threshold number of content files having cache benefit scores that indicate a highest cache benefit; and
  selecting the threshold number of content files having cache benefit scores that indicate a highest cache benefit.

12. The method of claim 1 wherein determining the subset of content files to include in the proxy cache comprises:
  monitoring actual and anticipated access information across multiple, different network service providers;
  grouping the monitored actual and anticipated access information by network service provider;
  determining, for each of the multiple, different network service providers, cache benefit scores for content files based on the grouped actual and anticipated access information for the corresponding network service provider; and
  selecting, for each of the multiple, different network service providers, content files to cache based on the determined cache benefit scores, the selected content files being different among the multiple, different network service providers with content files selected for a first network service provider being different than content files selected for a second network service provider.

13. A system comprising:
  at least one computer; and
  at least one computer-readable medium coupled to the at least one computer having instructions stored thereon which, when executed by the at least one computer, causes the at least one computer to perform operations comprising:
  determining, for each of multiple content files, a metric indicative of anticipated availability of the corresponding content file from an internal peer that is within a network of a network service provider, the network service provider using less bandwidth to service content requests to internal peers that are within the network of the network service provider as compared to servicing content requests to external peers that are outside of the network of the network service provider;
  determining, for each of the multiple content files, a cache benefit score based on the determined metric indicative of anticipated availability of the corresponding content file from an internal peer that is within the network of the network service provider;
  determining, based on the cache benefit score determined for each of the of the multiple content files, a subset of the multiple content files to include in a proxy cache maintained by the network service provider that provides network service to a user media device included in a content delivery network;
  controlling the network service provider to store the subset of content files in the proxy cache; and
  controlling the user media device to attempt to use the proxy cache as a peer to access a content file prior to using an external peer that is outside of the network of the network service provider and accessible, to the user media device, on an external network through the network service provider,
  wherein determining, for each of the multiple content files, the metric indicative of anticipated availability of the corresponding content file from an internal peer that is within the network of the network service provider comprises:
  determining, for each of the multiple content files, a percentage of access requests for the corresponding content file that were serviced from an external peer that is outside of the network of the network service provider relative to access requests for the corresponding content file that were serviced from the proxy cache maintained by the network service provider, from an internal peer that is inside of the network of the network service provider, and from a content and directory database; and
  based on the determined percentage of access requests for the corresponding content file that were serviced from an external peer that is outside of the network of the network service provider, determining, for each of the multiple content files, the metric indicative of anticipated availability of the corresponding content file from an internal peer that is within the network of the network service provider.

14. The method of claim 1:
  wherein determining, for each of the multiple content files, the metric indicative of anticipated availability of the corresponding content file from an internal peer that is within the network of the network service provider comprises determining, for each of the multiple content files, a metric indicative of anticipated download availability of the corresponding content file from an internal peer that is within a network of a network service provider;
  wherein determining, for each of the multiple content files, the cache benefit score based on the determined metric indicative of anticipated availability of the corresponding content file from an internal peer that is within the network of the network service provider comprises determining, for each of the multiple content files, a cache benefit score based on the determined metric indicative of anticipated download availability of the corresponding content file from an internal peer that is within the network of the network service provider;
  wherein determining, based on the cache benefit score determined for each of the of the multiple content files, the subset of the multiple content files to include in the proxy cache maintained by the network service provider that provides network service to the user media device included in the content delivery network comprises determining, based on the cache benefit score determined for each of the of the multiple content files, a subset of the multiple content files to include in the proxy cache maintained by the network service provider that provides network service to a user downloader device included in the content delivery network; and wherein controlling the user media device to attempt to use the proxy cache as a peer to access a content file prior to using an external peer that is outside of the network of the network service provider and accessible, to the user media device, on an external network through the network service provider comprises controlling the user downloader device to attempt to use the proxy cache as a peer to download a content file prior to using an external peer that is outside of the network of the network service provider and accessible, to the user downloader device, on an external network through the network service provider.

15. The method of claim 1, wherein determining, for each of the multiple content files, the percentage of access requests for the corresponding content file that were serviced from an external peer that is outside of the network of the network service provider relative to access requests for the corresponding content file that were serviced from the proxy cache maintained by the network service provider, from an internal peer that is inside of the network of the network service provider, and from a content and directory database comprises:

determining, for each of the multiple content files, a total number of requests for the corresponding content file;

determining, for each of the multiple content files, a number of requests for the corresponding content file that have been handled by an external peer that is outside of the network of the network service provider; and calculating, for each of the multiple content files, a ratio of the number of requests for the corresponding content file that have been handled by an external peer that is outside of the network of the network service provider and the total number of requests for the corresponding content file; and determining, for each of the multiple content files, the percentage of access requests for the corresponding content file that were serviced from an external peer that is outside of the network of the network service provider relative to access requests for the corresponding content file that were serviced from the proxy cache maintained by the network service provider, from an internal peer that is inside of the network of the network service provider, and from a content and directory database based on the calculated ratio.

16. A method of controlling a media device to access content from a cache, the method comprising:

determining, for each of multiple content files, a metric indicative of anticipated availability of the corresponding content file from an internal peer that is within a network of a network service provider, the network service provider using less bandwidth to service content requests to internal peers that are within the network of the network service provider as compared to servicing content requests to external peers that are outside of the network of the network service provider;

determining, for each of the multiple content files, a cache benefit score based on the determined metric indicative of anticipated availability of the corresponding content file from an internal peer that is within the network of the network service provider;

determining, based on the cache benefit score determined for each of the of the multiple content files, a subset of the multiple content files to include in a proxy cache maintained by the network service provider that provides network service to a user media device included in a content delivery network;

controlling the network service provider to store the subset of content files in the proxy cache; and controlling the user media device to attempt to use the proxy cache as a peer to access a content file prior to using an external peer that is outside of the network of the network service provider and accessible, to the user media device, on an external network through the network service provider, wherein determining, for each of the multiple content files, the metric indicative of anticipated availability of the corresponding content file from an internal peer that is within the network of the network service provider comprises:

querying historical logs to determine, for each of the multiple content files, a percentage of access requests for the corresponding content file that were serviced from an internal peer within the network of the network service provider relative to access requests serviced from the proxy cache maintained by the network service provider, from an external peer that is outside of the network of the network service provider, and from a content and directory database; and based on the determined percentage of access requests for the corresponding content file that were serviced from an internal peer that is within the network of the network service provider, determining, for each of the multiple content files, the metric indicative of anticipated availability of the corresponding content file from an internal peer that is within the network of the network service provider.

17. The method of claim 16 wherein querying historical logs to determine, for each of the multiple content files, a percentage of access requests for the corresponding content file that were serviced from an internal peer within the network of the network service provider comprises excluding, from the access requests serviced from an internal peer within the network of the network service provider, access requests serviced from the proxy cache maintained by the network service provider, access requests serviced from an external peer that is outside of the network of the network service provider, and access requests serviced from a content and directory database.

18. The method of claim 1 wherein determining, for each of the multiple content files, the cache benefit score based on the determined metric indicative of anticipated availability of the corresponding content file from an internal peer that is within the network of the network service provider comprises decreasing, for a particular content file included in the multiple content files, the cache benefit score for the particular content file based on the determined metric indicative of anticipated availability of the particular content file from an internal peer that is within the network of the network service provider indicating increased availability of the particular content file from an internal peer that is within the network of the network service provider.

* * * * *

UNITED STATES PATENT AND TRADEMARK OFFICE
CERTIFICATE OF CORRECTION

PATENT NO. : 8,478,836 B1  
APPLICATION NO. : 12/794981  
DATED : July 2, 2013  
INVENTOR(S) : Jack H. Chang et al.

Page 1 of 1

It is certified that error appears in the above-identified patent and that said Letters Patent is hereby corrected as shown below:

In the Claims

In claim 1, column 22, line 16, delete "of the of the" and insert - - of the - -, therefor.

In claim 2, column 22, line 52, delete "of the of the" and insert - - of the - -, therefor.

In claim 2, column 22, line 61, delete "of the of the" and insert - - of the - -, therefor.

In claim 6, column 23, line 64, delete "of the of the" and insert - - of the - -, therefor.

In claim 6, column 24, line 7, delete "of the of the" and insert - - of the - -, therefor.

In claim 9, column 24, line 48, delete "of the of the" and insert - - of the - -, therefor.

In claim 10, column 25, line 4, delete "of the of the" and insert - - of the - -, therefor.

In claim 11, column 25, line 22, delete "of the of the" and insert - - of the - -, therefor.

In claim 13, column 26, line 5, delete "of the of the" and insert - - of the - -, therefor.

In claim 14, column 26, line 60, delete "of the of the" and insert - - of the - -, therefor.

In claim 14, column 26, line 66, delete "of the of the" and insert - - of the - -, therefor.

In claim 16, column 27, line 65, delete "of the of the" and insert - - of the - -, therefor.

Signed and Sealed this  
Third Day of September, 2013

Teresa Stanek Rea  
*Acting Director of the United States Patent and Trademark Office*